(12) United States Patent
Hirata et al.

(10) Patent No.: US 7,304,789 B2
(45) Date of Patent: Dec. 4, 2007

(54) MICROSCOPE SYSTEM AND OBJECTIVE UNIT

(75) Inventors: Tadashi Hirata, Hachioji (JP); Hiroya Fukuyama, Machida (JP); Yoshihiro Kawano, Fuchu (JP)

(73) Assignee: Olympus Corporation, Tokyo (JP)

( * ) Notice: Subject to any disclaimer, the term of this patent is extended or adjusted under 35 U.S.C. 154(b) by 77 days.

(21) Appl. No.: 11/057,165

(22) Filed: Feb. 15, 2005

(65) Prior Publication Data

US 2005/0200947 A1 Sep. 15, 2005

(30) Foreign Application Priority Data

| Feb. 24, 2004 | (JP) | ............................. 2004-047207 |
| Nov. 18, 2004 | (JP) | ............................. 2004-334976 |

(51) Int. Cl.
*G02B 21/00* (2006.01)

(52) U.S. Cl. ..................................... 359/368; 359/656

(58) Field of Classification Search ............... 359/368, 359/377, 656, 819, 827, 829, 821–822
See application file for complete search history.

(56) References Cited

U.S. PATENT DOCUMENTS 3,437,404 A * 4/1969 Seedhouse ................ 359/699

| 2002/0181096 | A1* | 12/2002 | Sasaki .......................... 359/389 |
| 2003/0058530 | A1* | 3/2003 | Kawano ...................... 359/385 |
| 2003/0081310 | A1* | 5/2003 | McManus .................... 359/376 |
| 2004/0224315 | A1* | 11/2004 | Villa et al. ...................... 435/6 |

FOREIGN PATENT DOCUMENTS

| JP | 03-087804 | 4/1991 |
| JP | 05-072481 | 3/1993 |
| JP | 07-306364 | 11/1995 |

\* cited by examiner

*Primary Examiner*—Leonidas Boutsikaris
*Assistant Examiner*—Mark Consilvio
(74) *Attorney, Agent, or Firm*—Kenyon & Kenyon LLP

(57) ABSTRACT

A microscope system includes a light source and an objective unit. The objective unit includes an objective optical system, including a small-diameter distal optical system arranged at an end brought near to or into contact with a specimen, for focusing light from the light source onto the specimen; a threaded mount at a coupling position; and an outer cylinder enclosing the small-diameter distal optical system. The microscope system further includes an imaging optical system for forming an image of light from the specimen through the objective optical system and a microscope main body for housing the imaging optical system. The objective unit is detachable from and attachable to the microscope main body with the threaded mount. Conditional expression Df/Da≦0.3 is satisfied, where Df represents the outer diameter of the outer cylinder and Da represents the outer diameter of the threaded mount.

12 Claims, 20 Drawing Sheets

FIG. 2A
FIG. 2B
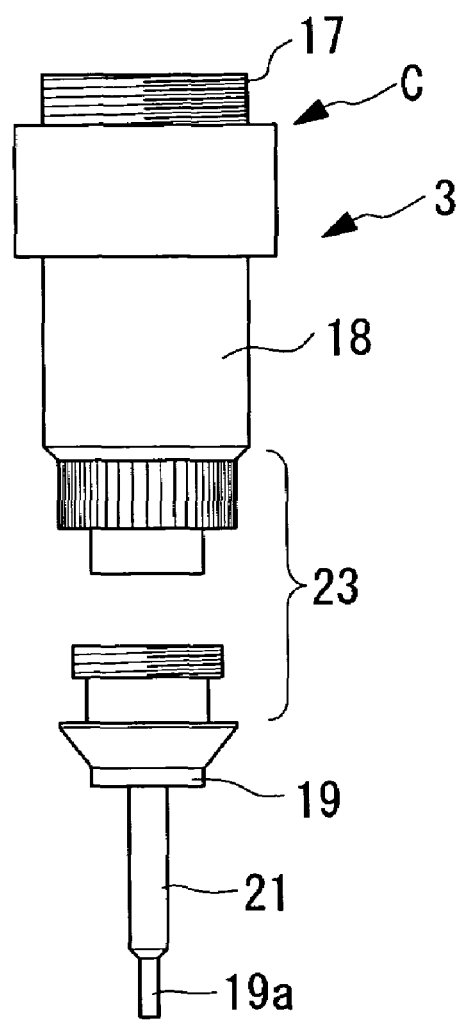
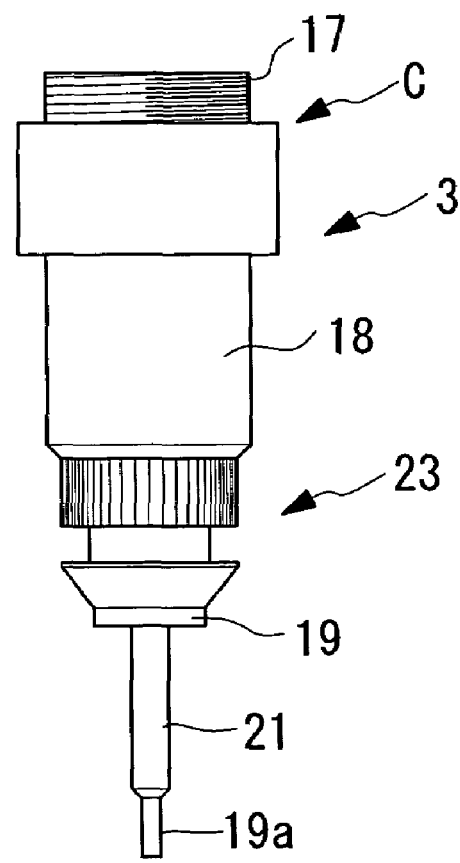

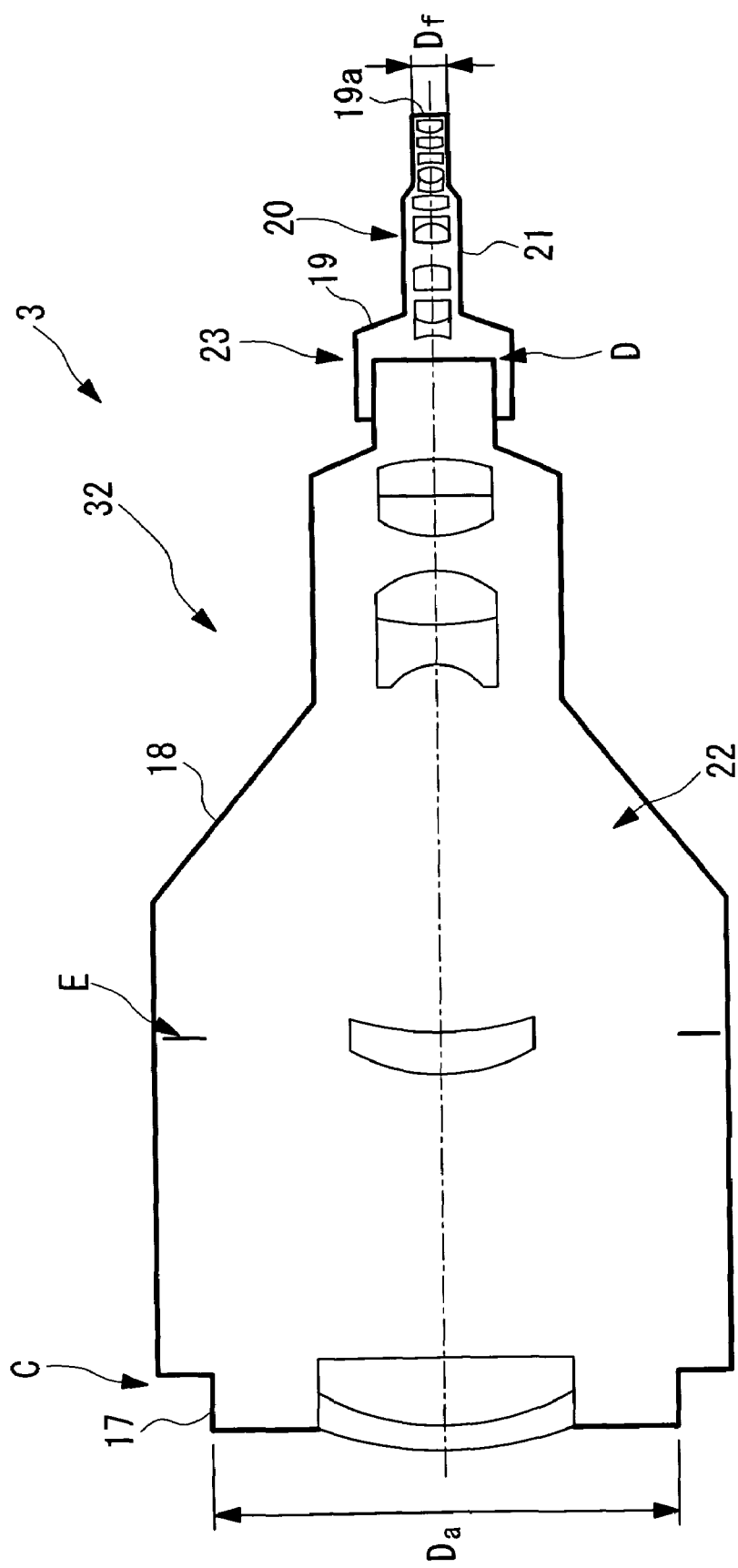

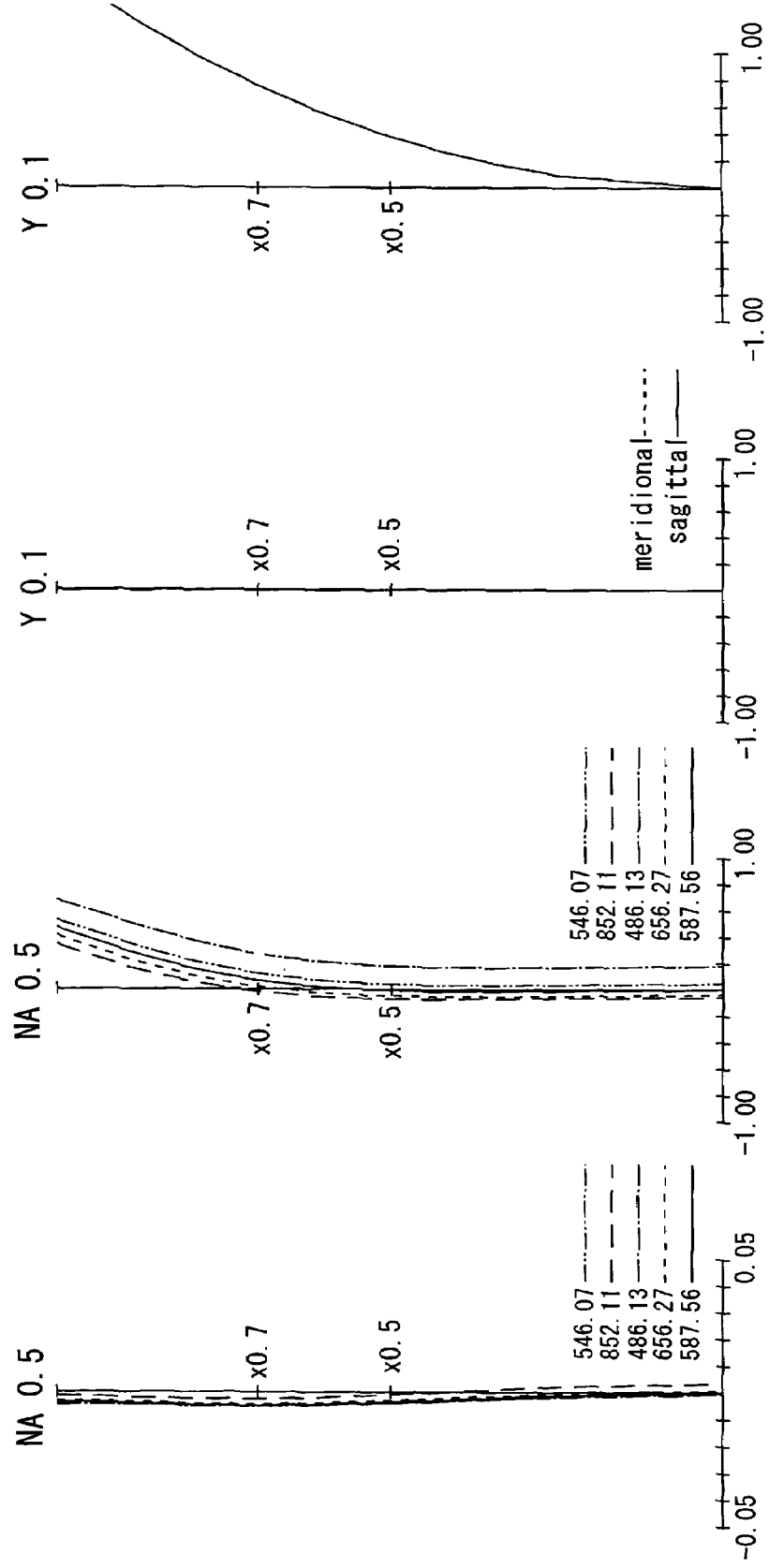

ns between species. An objective of the present invention is to provide such a microscope system.

MICROSCOPE SYSTEM AND OBJECTIVE UNIT

BACKGROUND OF THE INVENTION

1. Field of the Invention

The present invention relates to microscope systems and objective units used for applications such as the study and imaging of cellular function, and particularly to a microscope system and an objective unit suitable for in-vivo examination of animals, such as mammals.

2. Description of Related Art

Known laser-scanning confocal microscopes include apparatuses for examining cellular function by illuminating the surface of a specimen, such as a living organism, with excitation light to selectively detect fluorescence emitted from a predetermined depth in the specimen, as described on, for example, page 2 of Japanese Unexamined Patent Application Publication No. Hei-3-87804 and FIG. 1 of Japanese Unexamined Patent Application Publication No. Hei-5-72481.

These laser-scanning confocal fluorescence microscopes provide not only a general observation function of microscopes but also a function for acquiring images by scanning a laser beam focused on a minute spot of a specimen with a scanning device, such as a galvano mirror, to detect fluorescence emitted from the specimen.

The laser-scanning confocal microscopes have a resolution high enough to eliminate light other than light from the minute spot of interest, and are therefore advantageous in that they can acquire clear examination images with high S/N ratio.

A method for marking particular molecules, tissues, or cells of a living organism with a dye or fluorescent marker and observing them with a fluorescence microscope or a laser-scanning confocal microscope to examine molecule behavior in the cells or tissues is also known. Because some molecules in individual living organisms of mammals, such as mice, exhibit different behavior from those in cultured cells, it is necessary to examine biological tissues or cells of living organisms while they alive (in vivo). Furthermore, the objective lens of these laser-scanning confocal microscopes is in an infinity system and is constructed such that an image is formed at an imaging lens in the tube barrel (refer to, for example, Japanese Unexamined Patent Application Publication No. Hei-7-306364).

Unfortunately, microscopes including these known laser-scanning confocal microscopes do not assume that various organs of small laboratory animals, such as rats and mice, are examined in vivo. In other words, to observe various organs of a small laboratory animal with a known laser-scanning confocal microscope, it is necessary to cut the skin and muscular tissue or perforate the skull to expose the organs. Furthermore, the size of such an incision or trephination needs to be quite large because the outer diameter of the objective lens to be brought close to the examination site is relatively large.

If this is the case, the small laboratory animal is damaged to such a considerable degree that time-lapse examination over an extended period of time becomes difficult, though observation is possible only for a short period of time after incision or trephination. It would be possible to suture the incision after examination and to cut open the examination site again for another examination at a later time. In general, however, incision itself causes such considerable damage to the small laboratory animal that examination of the animal under normal healthy conditions is difficult.

BRIEF SUMMARY OF THE INVENTION

The present invention is conceived in light of these circumstances, and an object of the present invention is to provide a microscope system and an objective unit for enabling biological tissues, such as cells and muscular tissues, or various organs, such as the heart and the liver, of mammals, including small laboratory animals, to be observed in vivo over a relatively long period of time.

To achieve the above-described object, the present invention provides the following features.

According to one aspect of the present invention, a microscope system includes a light source and an objective unit. The objective unit includes an objective optical system, including a small-diameter distal optical system arranged at an end that is brought near to or into contact with a specimen, for focusing light from the light source onto the specimen; a threaded mount at a coupling position; and an outer cylinder enclosing the small-diameter distal optical system. The microscope system further includes an imaging optical system for forming an image of light that is emitted from the specimen and passes through the objective optical system and a microscope main body for housing the imaging optical system. The objective unit is detachable from and attachable to the microscope main body with the threaded mount. In this microscope system, conditional expression (1) below is satisfied:

$$Df/Da \leq 0.3 \tag{1}$$

where $Df$ represents the outer diameter of the outer cylinder and $Da$ represents the outer diameter of the threaded mount.

The small-diameter distal optical system with a small outer diameter provided at the end of the objective unit is brought near to or into contact with the specimen, serving as an object to be examined. Therefore, even if the object exists at a deep site in a small laboratory animal, it can be examined without having to make a large incision in the skin or muscular tissue, i.e., merely by providing only a small opening and inserting the small-diameter distal optical system through the opening. As a result, the small laboratory animal can be examined in-vivo over a long period of time without causing significant damage to the small laboratory animal.

It is preferable that the objective optical system further include a relay optical system for substantially collimating light of an intermediate image formed by focusing light from an object image in the specimen with the small-diameter distal optical system.

The intermediate image is formed with the small-diameter distal optical system and then the light of the intermediate image is substantially collimated with the relay optical system, so that the thin outer cylinder can be made sufficiently long.

It is preferable that the microscope system further include an attachment mechanism for detachably and attachably connecting the relay optical system and the small-diameter distal optical system near the intermediate image.

With this structure, while the small-diameter distal optical system is connected to the relay optical system with the attachment mechanism to examine the body cavity of the small laboratory animal in-vivo, the small-diameter distal optical system can be separated from the relay optical system by unlocking the attachment mechanism to keep the small-diameter distal optical system positioned at the small laboratory animal. For another examination later on, the same site can be examined merely by re-connecting the relay optical system to the positioned small-diameter distal optical system with the attachment mechanism. This approach allows the small-diameter distal optical system to remain positioned at the same site from one examination to another. Another advantage of this approach is that the specimen is not damaged because the small-diameter distal optical system is not moved relative to the specimen.

Setting the attachable/detachable portion at a point near the intermediate image can moderate adverse effects due to position or angle inaccuracy possibly occurring when a relay optical system unit and a small-diameter distal optical system unit are connected.

The attachment mechanism may be capable of fixing the relay optical system and the small-diameter distal optical system to each other at any relative rotational angle about an axis thereof.

The small-diameter distal optical system can remain positioned at the specimen for another examination at a later time, when the relay optical system can be connected to the positioned small-diameter distal optical system with the attachment mechanism. In this case, the attachment mechanism locks the small-diameter distal optical system and the relay optical system such that they do not turn relative to each other. This means that the small-diameter distal optical system can be connected to the relay optical system without having to turn the small-diameter distal optical system positioned at the specimen, at whatever rotational angle position the relay optical system is set. As a result, the specimen is not damaged.

The small-diameter distal optical system may include an extension optical system for forming a plurality of intermediate images at intervals in the optical axis direction.

Light propagates such that a plurality of intermediate images is formed along the optical axis direction due to the operation of the extension optical system, and hence the overall length of the small-diameter distal optical system can be increased. Consequently, even an object existing at a deep site, such as an organ of a small laboratory animal, is accessible by the end of the small-diameter distal optical system merely by providing only a small opening to examine the small laboratory animal in-vivo.

The extension optical system may be detachable and attachable.

The extension optical system is used to examine a deep site, whereas the extension optical system is removed to examine a shallow site or a site that can be examined from the skin. This allows examination at various depths to be conducted, depending on the examination site.

It is preferable that the microscope system further include an orientation-adjusting mechanism capable of adjusting the microscope main body to any orientation and position with respect to the specimen.

The microscope main body can be adjusted to a position and orientation appropriate for examination of the specimen through the operation of the orientation-adjusting mechanism. In particular, for examination of an object at which the small-diameter distal optical system is pre-positioned, the object can be examined without damaging the specimen by appropriately moving the microscope main body according to the position and orientation of the small-diameter distal optical system.

The microscope system may further include a light-scanning unit for scanning excitation light from the light source onto a surface of the specimen; a pupil-projection optical system disposed between the light-scanning unit and the imaging optical system to project a back focal position of the objective optical system near the light-scanning unit; a collimating optical system for focusing light that passes through the pupil-projection optical system; and a photodetector for detecting light focused by the collimating optical system. The light source may include a laser light source.

Excitation light emitted from the laser light source is scanned on the surface of the specimen by the operation of the light-scanning unit. Fluorescence excited in the specimen illuminated with the excitation light is focused by the collimating optical system and detected by the photodetector via the objective optical system, the imaging optical system, and the pupil-projection optical system. As a result, a laser-scanning confocal microscope can be realized to acquire a clear image of even an object existing at a deep site in a living organism, such as an organ of a small laboratory animal.

It is preferable that the light source and the photodetector be optically connected to the collimating optical system with an optical fiber.

The objective unit mounted on the microscope main body can be freely positioned to enhance operability by interconnecting the separately provided light source and the photodetector with the optical fiber. Furthermore, as a result of the light source and the photodetector being separated from the microscope main body, the microscope main body itself can be made small and lightweight.

It is preferable that conditional expression (2) be satisfied:

$$0.15 \leq Lm/Lp \leq 0.5 \tag{2}$$

where Lm represents the distance from the coupling position of the objective optical system to a position of the intermediate image along the optical axis, and Lp represents the distance, along the optical axis, from the coupling position to a position that has a conjugate relationship with the back focal position of the objective optical system through the imaging optical system and the pupil-projection optical system.

It is preferable that conditional expression (3) be satisfied:

$$0.15 \leq Lm/Ltl \leq 0.5 \tag{3}$$

where Lm represents the distance from the coupling position of the objective optical system to a position of the intermediate image along the optical axis, and Ltl represents the distance, along the optical axis, from a position of an image formed by the imaging optical system to the intermediate image.

With the above-described structures, the distance from the light-scanning unit to the relay optical system can be shortened to make the system compact. If the upper limit of conditional expression (2) or (3) is exceeded, the focal lengths of the imaging optical system and the pupil-projection optical system become short, which causes the distance between the pupil-projection optical system and the scanning unit to become too short to prevent interference. In contrast, if the lower limit of conditional expression (2) or (3) is not reached, the total length from the specimen to the scanning unit becomes so long that it is difficult to make the system compact.

The threaded mount of the objective unit may have an outer diameter Da of 20.32 mm and a pitch of 0.706 mm.

The small-diameter distal optical system may have a length of at least 5 mm.

The small-diameter distal optical system may include a portion with a length of at least 2 mm, wherein the diameter of the outer cylinder is 1.5 mm or less over that portion.

According to another aspect of the present invention, an objective unit includes a threaded mount provided at a coupling position, the threaded mount being used to detachably and attachably connect the objective unit to a microscope main body; and a small-diameter distal optical system arranged at an end that is brought near to or into contact with a specimen. In this objective unit, conditional expression (1) is satisfied:

$$Df/Da \leq 0.3 \tag{1}$$

where Df denotes the outer diameter of an outer cylinder enclosing the small-diameter distal optical system and Da denotes the outer diameter of the threaded mount.

Even an object existing at a deep site in a small laboratory animal can be examined without having to make a large incision in the skin or muscular tissue, i.e., merely by providing only a small opening and inserting the small-diameter distal optical system through the opening. As a result, the small laboratory animal can be examined in-vivo over a long period of time without causing significant damage to the small laboratory animal.

The objective unit may further include a relay optical system for substantially collimating light of an intermediate image formed by focusing light from an object image in the specimen with the small-diameter distal optical system.

It is preferable that an image-side focal position of an objective optical system including the relay optical system and the small-diameter distal optical system be arranged within 40 mm from the coupling position towards an object side.

In a typical microscope system, the image-side focal position of the objective optical system is set within 40 mm from the coupling position of the objective lens towards the object side. Therefore, compatibility with known microscope systems is ensured by matching the image-side focal position of the objective optical system of the objective unit having the small-diameter distal optical system with that of a standard microscope system.

It is preferable that the objective unit further include an attachment mechanism for detachably and attachably connecting the relay optical system and the small-diameter distal optical system near the intermediate image.

The attachment mechanism is capable of fixing the relay optical system and the small-diameter distal optical system to each other at any relative rotational angle about an axis thereof.

The small-diameter distal optical system may include an extension optical system for forming a plurality of intermediate images at intervals in an optical axis direction.

The extension optical system may include a plurality of relay optical system units detachable from and attachable to one another or the extension optical system may include a GRIN lens.

The relay optical system may include a first lens group with positive refractive power, the first lens group including at least one of a parallel plate and a planoconvex lens component; a second lens group with negative refractive power, the second lens group including at least one meniscus lens component with a concave surface facing an object side; and a third lens group with positive refractive power, the third lens group including at least one compound lens, in that order from the small-diameter distal optical system to the coupling position.

The first lens group is so small in diameter that a ray with a small ray height coming from the object point is made to converge while maintaining the small ray height with high refractive power to guide the ray into the second lens group.

Furthermore, providing an optical system with no refractive power, such as the parallel plate, allows the first lens group to be long.

In order to make the portion of the first lens group thin, the focal length of the first lens group needs to be made relatively small and the refractive power needs to be high. However, connecting an imaging lens of the microscope system directly after the first lens group with a small focal length causes the magnification to be high, leading to a small examination area. To overcome this problem, the second lens group is given negative refractive power to increase the focal length of the entire relay optical system, which is an objective optical system designed in an infinity system. This allows the magnification to be decreased and hence the examination area to be widened.

In this case, the second lens group exhibits the feature of a quasi-aplanatic meniscus lens due to the included meniscus lens with the concave surface facing the object side. With this second lens group, spherical aberration and coma can be suppressed despite a large incident angle of rays.

The third lens group is given positive refractive power to achieve afocal outgoing beam, and, with the concave power of the interface, can satisfactorily correct various types of aberration, such as spherical aberration and chromatic aberration, that cannot be corrected with the first and second lens groups.

It is preferable that conditional expressions (4) and (5) be satisfied:

$$0.25 < F_1/F < 0.35 \tag{4}$$

$$0.5 < LG_1 * n_1/L < 0.6 \tag{5}$$

where F represents the focal length of the overall relay optical system; $F_1$ represents the focal length of the first lens group; $LG_1$ represents the distance from the object surface to the last surface of the first lens group; L represents the distance from the object surface to the last surface of the relay optical system; and $n_1$ represents the highest refractive index from among those of the lenses in the first lens group.

Conditional expression (4) specifies an appropriate value for the relationship between the positive refractive power in the first lens group and the overall refractive power. If the upper limit of conditional expression (4) is exceeded, the refractive power of the first lens group is too low to maintain a small ray height. This makes it difficult to achieve thin design and also causes overcorrection of spherical aberration. Furthermore, since the focal length of the overall system becomes short, magnification is disadvantageously increased, resulting in a small examination area. In contrast, if the lower limit of conditional expression (4) is not reached, the refractive power of the first lens group is so high as to cause undercorrection of spherical aberration.

Conditional expression (5) specifies an appropriate length of the first lens group. If the upper limit of conditional expression (5) is exceeded, the ratio of the length of the first lens group to the overall length is increased to increase the refractive power of the second and third lens groups. This makes it difficult to correct spherical aberration and coma in the second and third lens groups. In contrast, if the lower limit of conditional expression (5) is not reached, the first lens group, serving as a small-diameter portion, becomes short and the refractive power of the first lens group becomes high, causing undercorrection of spherical aberration.

It is preferable that conditional expression (6) be satisfied:

$$0.15 < |F_2/F| - |t_2/R_{12}| < 0.45 \tag{6}$$

where F represents the focal length of the overall relay optical system; $F_2$ represents the focal length of the second lens group; $t_2$ represents the distance between an image-side surface of the lens disposed closest to the image side in the first lens group and an image-side surface of the lens disposed closest to the image side in the second lens group; and $R_{12}$ represents the image-side radius of curvature of the lens disposed closest to the image side in the first lens group.

Conditional expression (6) specifies the image-side radius of curvature of the lens disposed closest to the image side in the first lens group and the refractive power of the second lens group. If the upper limit of conditional expression (6) is exceeded, the refractive power of the second lens group becomes so short that the distance between the first lens group and the second lens group becomes long, and furthermore, the second and third lens groups become short. This makes it difficult to correct spherical aberration and coma in the second and third lens groups. If the lower limit of conditional expression (6) is not reached, the focal length of the overall system becomes short. This causes magnification to be disadvantageously increased, leading to a small examination area.

The relay optical system may include a first lens group with positive refractive power, the first lens group converting a beam from an object point into a substantially collimated beam; a second lens group with negative refractive power, the second lens group increasing the diameter of the collimated beam from the first lens group; and a third lens group with positive refractive power, the third lens group converting a diverging beam from the second lens group into a collimated beam, in that order from the small-diameter distal optical system to the coupling position. In addition, conditional expression (7) may be satisfied:

$$0.01 < |F_1^2 \cdot NA/(F_2 \cdot F)| < 0.03 \quad (7)$$

where F represents the focal length of the overall relay optical system; $F_1$ represents the focal length of the first lens group; $F_2$ represents the focal length of the second lens group; and NA represents the numerical aperture of the relay optical system.

The second and third lens groups are formed as substantially afocal optical systems. Conditional expression (7) specifies an appropriate value for the relationship between the focal length of the first lens group, the focal length and the collimated beam diameter of the second lens group, and the focal length of the overall system.

If the upper limit of conditional expression (7) is exceeded, the refractive power of the first lens group is too low to maintain a small ray height. This makes it difficult to achieve a thin design and also causes overcorrection of spherical aberration. In contrast, if the lower limit of conditional expression (7) is not reached, the refractive power of the first lens group is so high as to cause undercorrection of spherical aberration. Furthermore, due to the substantially afocal designs of the second and third lens groups, the distal section (small-diameter distal section) of the first lens group and the second lens group can be made long, and furthermore, the amount of refraction of rays in the small-diameter distal section can be made relatively small. This suppresses the amount of aberration.

According to still another aspect of the present invention, a relay optical system unit includes one of the relay optical systems and a barrel for housing the relay optical system.

This relay optical system unit can be made compatible with a standard microscope objective unit by providing a threaded mount disposed at a coupling position for mounting on the microscope main body. Furthermore, providing a small-diameter distal section allows the interior of an object to be examined merely by making a small opening in the object. As a result, the object can be examined in-vivo over a long period of time without causing significant damage to the object.

It is preferable that a small-diameter imaging optical system that is brought near to or into contact with a specimen be arranged at the end of the relay optical system.

When various organs of a small laboratory animal, such as a rat or a mouse, are to be examined over a long period of time while the animal is alive (in vivo), the skin and muscular tissue are cut open. Since the objective optical system can have a long small-diameter section, organs existing at a deeper site can be examined.

It is preferable that conditional expression (8) be satisfied:

$$95 < F_1/(\phi_{ob} \cdot NA_{ob}) < 115 \quad (8)$$

where $F_1$ represents the focal length of the first lens group of the relay optical system; $\phi_{ob}$ represents an area that can be examined with the small-diameter imaging optical system; and $NA_{ob}$ represents the object-side numerical aperture of the small-diameter imaging optical system.

Conditional expression (8) specifies an appropriate value for the relationship between the object-side numerical aperture and examination area of the small-diameter imaging optical system and the refractive power of the first lens group of the relay optical system. If the upper limit of conditional expression (8) is exceeded, the refractive power of the first lens group is too low to maintain a small ray height. This makes it difficult to achieve a thin design and also causes overcorrection of spherical aberration. In contrast, if the lower limit of conditional expression (8) is not reached, the refractive power of the first lens group is so high as to cause undercorrection of spherical aberration. Furthermore, since the numerical aperture and the examination area of the small-diameter imaging optical system are increased, it becomes difficult to design a microscope system.

The threaded mount of the objective unit may have an outer diameter Da of 20.32 mm and a pitch of 0.706 mm.

The small-diameter distal optical system may have a length of at least 5 mm.

The small-diameter distal optical system may include a portion with a length of at least 2 mm, the diameter of the outer cylinder being 1.5 mm or less over that portion.

According to the present invention, even an object existing at a deep site in a body cavity can be examined without having to make a large incision in the skin or muscular tissue, i.e., merely by providing only a small opening and inserting the small-diameter distal optical system through the opening. As a result, the object can be examined in-vivo over a long period of time without causing significant damage to the object to be examined.

BRIEF DESCRIPTION OF THE SEVERAL VIEWS OF THE DRAWINGS

FIGS. 2A and 2B are front elevational views of an objective unit according to the first embodiment used in the microscope system in FIG. 1, where FIG. 2A is a view of the objective unit when separated from the microscope system, whereas FIG. 2B is a view of the objective unit when connected to the microscope system.

FIG. 3 is a schematic diagram depicting optical members in the objective unit shown in FIGS. 2A and 2B.

FIGS. 18A, 18B, 18C, and 18D show spherical aberration, deviation from the sine condition, astigmatism, and distortion, respectively.

FIGS. 20A, 20B, 20C, and 20D show spherical aberration, deviation from the sine condition, astigmatism, and distortion, respectively.

FIGS. 22A, 22B, 22C, and 22D show spherical aberration, deviation from the sine condition, astigmatism, and distortion, respectively.

FIGS. 24A to 24D are diagrams depicting aberrations of the system shown in FIG. 23, where FIGS. 24A, 24B, 24C, and 24D show spherical aberration, deviation from the sine condition, astigmatism, and distortion, respectively.

DETAILED DESCRIPTION OF THE INVENTION

A microscope system and an objective unit according to one embodiment of the present invention will now be described with reference to FIGS. 1 to 10.

Figure 1:
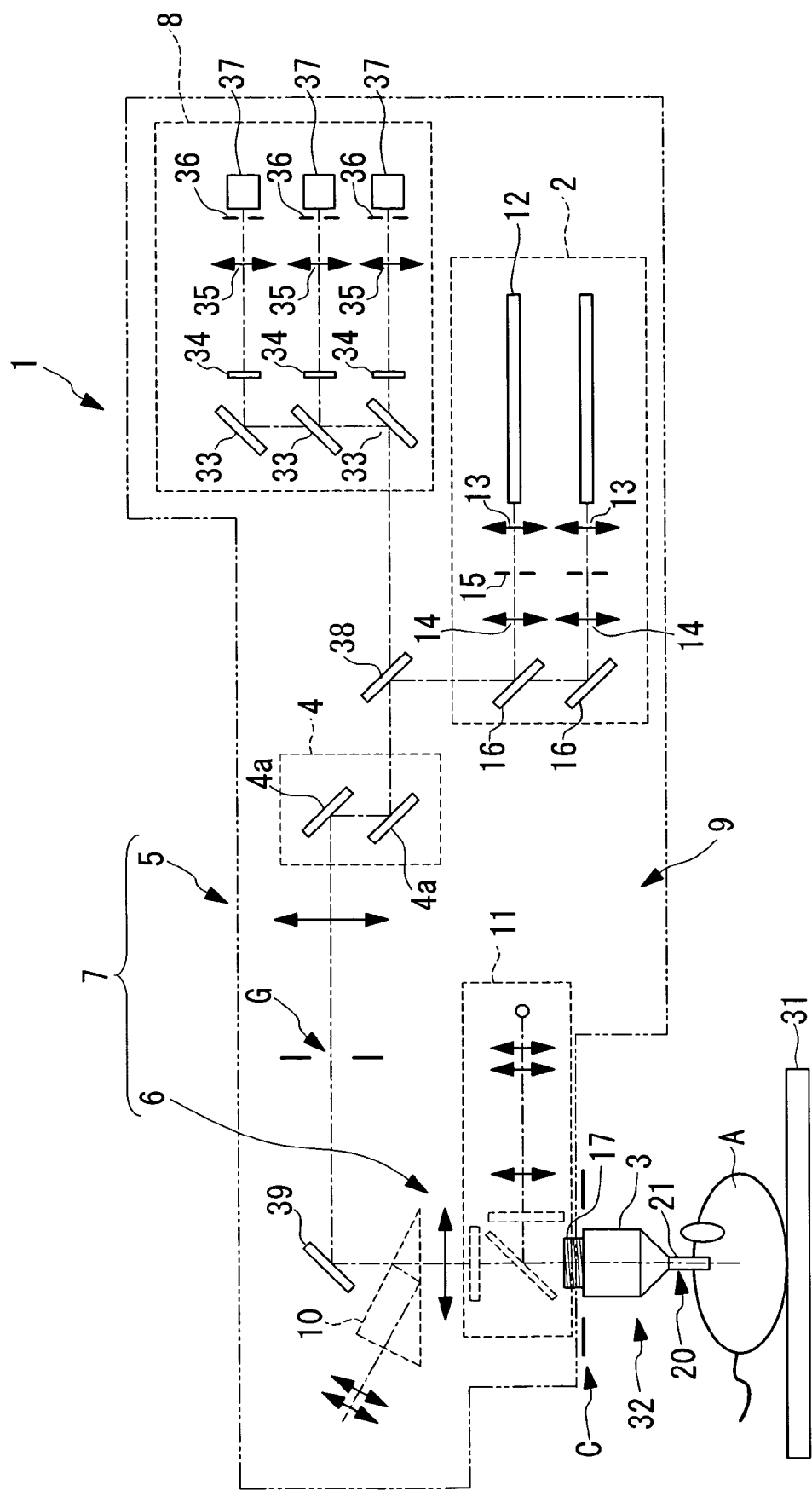
FIG. 1 is a schematic diagram of a microscope system according to a first embodiment of the present invention.

Referring to FIG. 1, the microscope system according to this embodiment is a laser-scanning confocal fluorescence microscope 1 that includes, in a microscope main body 9, a laser light source unit 2; a replaceable objective unit 3; a scanning unit 4 serving as a scanning mechanism; a lens unit 7 provided with a pupil-projection optical system 5 and an imaging optical system 6; and a detection optical system 8. Reference numerals 10 and 11 in FIG. 1 denote an eyepiece optical system and an illumination optical system, respectively.

The laser light source unit 2 includes laser light sources 12 realized by, for example, semiconductor lasers; collimating optical systems having lenses 13 and 14 and pinholes 15; and dichroic mirrors 16.

Referring to FIGS. 2A, 2B, and 3, the objective unit 3 according to this embodiment includes a relay optical system unit 18 having a threaded mount 17 for attaching/detaching to/from the microscope main body 9 and a small-diameter distal optical system unit 19 attachably/detachably provided at the end of the relay optical system unit 18.

Figure 4:
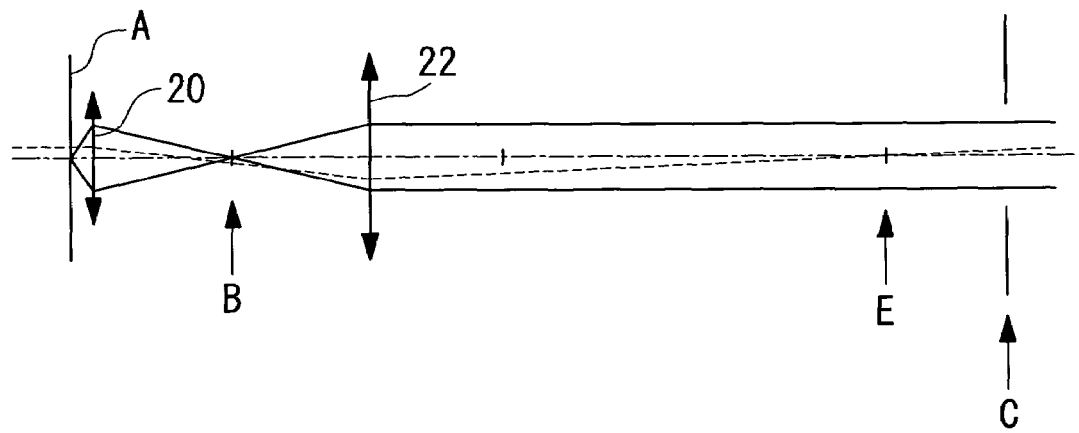
FIG. 4 is a schematic diagram of a light path of an objective optical system.

Referring to FIG. 3, the small-diameter distal optical system unit 19 includes a small-diameter distal optical system 20 extending in the axial direction from a tip 19a, which is brought near to or into contact with a specimen A serving as an object to be examined. Referring to FIG. 4, this small-diameter distal optical system 20 is constructed so as to focus light from the object image in the specimen A to form a first intermediate image B. This structure allows a beam to be guided while maintaining a small beam diameter. The small-diameter distal optical system unit 19 includes an outer cylinder 21 enclosing the small-diameter distal optical system 20. The outer cylinder 21 is formed like a cylinder having an outer diameter (Df=) of 2 mm in a region 5 mm from the tip 19a, and an outer diameter of 1.3 mm in a region 2 mm from the tip 19a. Although these dimensions are just examples, it is preferable that the following conditional expression (1) be satisfied:

$$Df/Da \leq 0.3 \tag{1}$$

where Df denotes the outer diameter of the distal section of the outer cylinder 21 and Da denotes the outer diameter of the threaded mount 17 of the relay optical system unit 18.

Referring to FIG. 4, the relay optical system unit 18 includes a relay optical system 22 for substantially collimating the light of the first intermediate image B formed by the small-diameter distal optical system 20.

The threaded mount 17 of the relay optical system unit 18 is in compliance with the standards for threaded objective-lens mounts of typical microscopes. More specifically, the threaded mount 17 is 20.32 mm in outer diameter (Da=) and 0.706 mm in pitch, so that it can be used for other general microscopes. A coupling position C of the objective unit 3 for connection to the microscope main body 9 corresponds to the base of the threaded mount 17 of this relay optical system unit 18.

Figure 5:
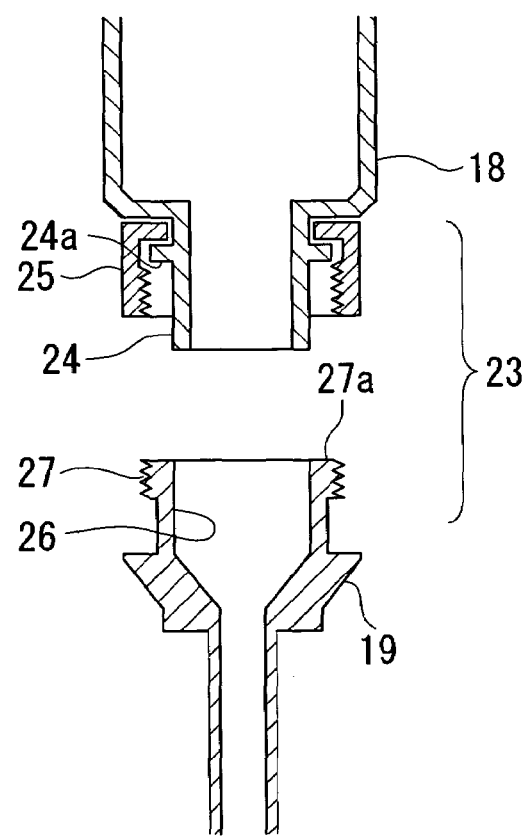
FIG. 5 is a longitudinal sectional view of one example of an attachment mechanism of the objective unit in FIGS. 2A and 2B.

Furthermore, at the end of the relay optical system unit 18, an attachment mechanism 23 for coupling the relay optical system unit 18 with the small-diameter distal optical system unit 19 is provided. Referring to FIG. 5, the attachment mechanism 23 is constructed so as to have a boss section 24 and a nut 25 in one of the relay optical system unit 18 and the small-diameter distal optical system unit 19 and to have a fitting hole 26 for receiving the boss section 24 and a male screw 27 engaged with the nut 25 in the other.

Figure 6:
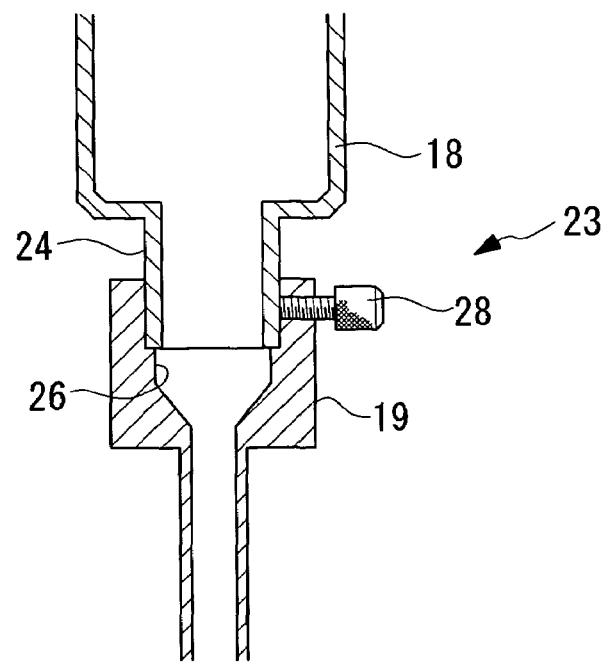
FIG. 6 is a longitudinal sectional view of another example of the attachment mechanism of the objective unit in FIGS. 2A and 2B.
Figure 7:
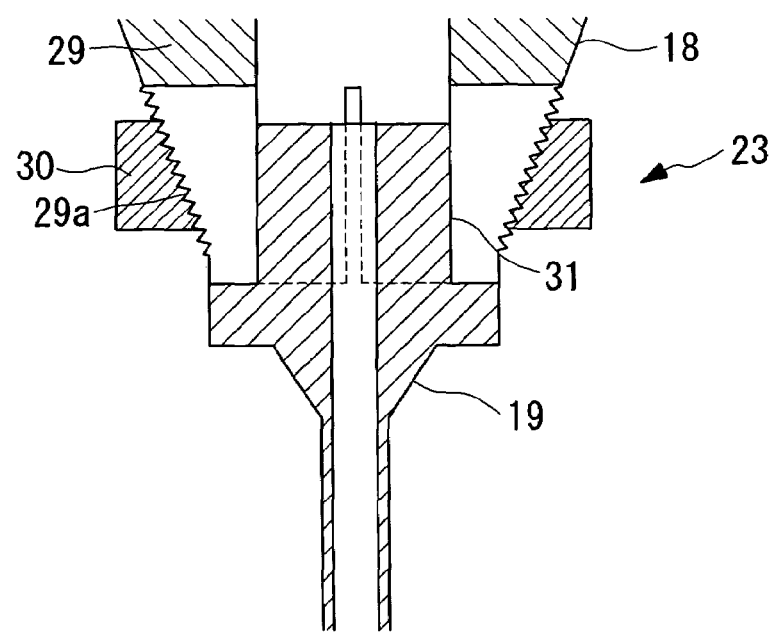
FIG. 7 is a longitudinal sectional view of still another example of the attachment mechanism of the objective unit in FIGS. 2A and 2B.

In the example shown in FIG. 5, an end surface 27a of the male screw 27 is engaged with a contact surface 24a provided on the lateral surface of the boss section 24 to define a coupling position D where the relay optical system unit 18 and the small-diameter distal optical system unit 19 are positioned along the optical axis direction. The structure of the attachment mechanism 23 is not limited to that shown in FIG. 5. For example, as shown in FIG. 6, the attachment mechanism 23 may be constructed so as to fix the boss section 24 in the fitting hole 26 by the use of a setscrew 28, or, as shown in FIG. 7, the attachment mechanism 23 may be constructed so as to form a tapered thread 29a on the outer surface of a slotted sleeve 29 to tighten an internal boss section 31 by turning a nut 30. As further alternatives, a spigot-mount mechanism, a bayonet-mount mechanism, a magnet-based absorption mechanism, etc. may be employed. For this purpose, it is preferable that the attachment mechanism 23 be constructed so as to link the relay optical system unit 18 with the small-diameter distal optical system unit 19 such that they do not turn relative to each other about the axis.

Furthermore, if the major part of the attachment mechanism 23 is provided in the small-diameter distal optical system unit 19, as shown in FIG. 6, an objective lens unit of a standard microscope can be used for the relay optical system unit 18 so that the outer surface of the objective lens unit can be fitted into the fitting hole 26 of the attachment mechanism 23.

The attachment mechanism 23 attachably/detachably connects the relay optical system unit 18 to the small-diameter distal optical system unit 19 at a point close to the first intermediate image B formed by the small-diameter distal optical system 20. Setting the attachable/detachable portion at a point near the first intermediate image B can moderate adverse effects due to position or angle inaccuracy possibly occurring when the relay optical system unit 18 and the small-diameter distal optical system unit 19 are connected.

The objective unit 3 with the above-described structure functions together with the imaging optical system 6 to focus excitation light from the laser light source unit 2 onto the specimen A on a stage 31. Referring back to FIG. 3, an image-side focal position E of an objective optical system 32 composed of the combined relay optical system 22 and small-diameter distal optical system 20 is arranged at a position, for example, 14.6 mm towards the specimen A from the coupling position C. In a typical microscope, the image-side focal position of the objective lens is set in a range 0 mm to 40 mm towards the object side from the coupling position. The objective unit 3 according to this embodiment satisfies this condition, and is hence compatible with standard microscope objective lenses.

Figure 8:
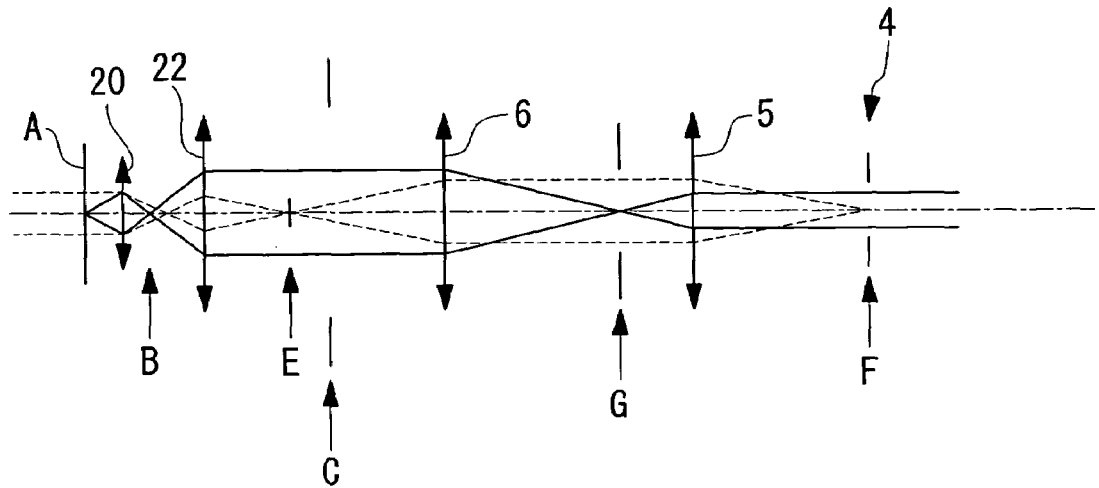
FIG. 8 is a schematic diagram of a light path from the object surface to the scanning unit of the microscope system in FIG. 1.

Referring to FIG. 8, the objective unit 3 is constructed such that its back focal position E has a conjugate relationship with a location F near the scanning unit 4 through the imaging optical system 6 and the pupil-projection optical system 5. The imaging optical system 6 has a function for forming a second intermediate image G of the specimen A. The pupil-projection optical system 5 is arranged between the scanning unit 4 and the imaging optical system 6.

Referring again to FIG. 1, the detection optical system 8 includes dichroic mirrors 33, barrier filters 34, lenses 35, confocal pinholes 36, and photosensors 37. Fluorescence emitted from the specimen A passes through the objective unit 3, the imaging optical system 6, the pupil-projection optical system 5, and the scanning unit 4, and is finally detected by the photosensors 37 of the detection optical system 8.

Furthermore, a dichroic mirror 38 is provided between the scanning unit 4 and the laser light source unit 2 to guide excitation light from the laser light source unit 2 to the specimen A and between the scanning unit 4 and the detection optical system 8 to guide fluorescence from the specimen A to the photosensors 37. Reference numeral 39 in FIG. 1 denotes a mirror.

A processing control unit (not shown in the figure), such as personal computer, is connected to the laser-scanning confocal fluorescence microscope. The processing control unit performs wavelength control of the laser light source unit 2; wavelength selection of the dichroic mirrors 16 and 33, the filter 34, etc.; control of a wavelength-splitting element (not shown in the figure); analysis and display of detected information received by the photosensors 37 of the detection optical system 8; drive control of the scanning unit 4, etc.

According to the microscope system 1 of this embodiment with the above-described structure, excitation light emitted from the laser light sources 12 is focused onto the pinholes 15 by the lenses 13 and is then converted into collimated light by the lenses 14. Thereafter, the collimated light is guided to the scanning unit 4 via the dichroic mirrors 16 and 38, and the beam is deflected in the two-dimensional directions with respect to the optical axis by the rotation of galvano mirrors 4a of the scanning unit 4. Thereafter, the excitation light is focused at a second intermediate image position G via the pupil-projection optical system 5 to form an image. The excitation light focused at the second intermediate image position G passes through the imaging optical system 6 and the objective unit 3 and is finally incident on the surface of the specimen A as a minute spot. At this time, the excitation light incident on the surface of the specimen A is scanned by the scanning unit 4.

Furthermore, the back focal position E of the objective unit 3 is projected onto the location F near the scanning unit 4 by the imaging optical system 6 and the pupil-projection optical system 5.

Fluorescence excited in the specimen A illuminated with the excitation light is guided to the detection optical system 8 via the objective unit 3, the imaging optical system 6, the pupil-projection optical system 5, the scanning unit 4, and the dichroic mirror 38. Then, the fluorescence passes through the dichroic mirrors 33, the barrier filters 34, and the lenses 35 in the detection optical system 8, and only fluorescence components that have passed through the confocal pinholes 36 are detected by the photosensors 37.

Since the microscope system 1 according to this embodiment includes the objective unit 3 having the small-diameter distal optical system unit 19 with a sufficiently small outer diameter at the end thereof, the small-diameter distal optical system unit 19 can be brought near to or into contact with the specimen A serving as the object to be examined. Therefore, even an object existing at a deep site in a small laboratory animal can be examined without having to make a large incision in the skin or muscular tissue, i.e., merely by providing only a small opening and inserting the small-diameter distal optical system unit 19 through the opening. As a result, the microscope system 1 according to this embodiment has an advantage in that it enables a small laboratory animal to be examined in-vivo over a long period of time without causing significant damage to the small laboratory animal.

Furthermore, according to the microscope system 1 of this embodiment, the first intermediate image B is formed with the small-diameter distal optical system 20, and then the light of the first intermediate image B is substantially collimated with the relay optical system 22, so that the thin outer cylinder 21 of the small-diameter distal optical system unit 19 can be made sufficiently long. Therefore, even if an object to be examined exists at a deep site in a small laboratory animal, it can be examined without having to make a large incision in the skin or muscular tissue.

Figure 9:
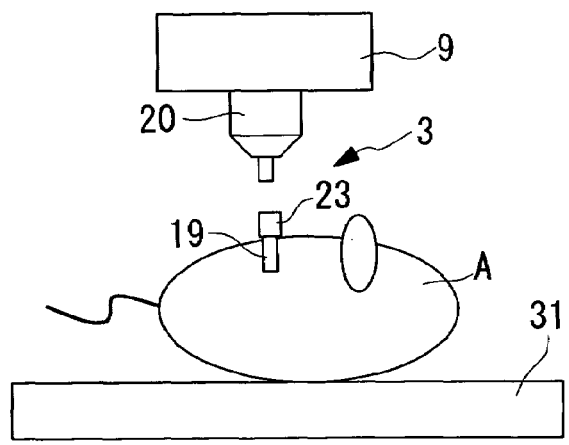
FIG. 9 is a schematic diagram depicting an example application of the objective unit in FIGS. 2A and 2B.

Furthermore, according to the microscope system 1 of this embodiment, while the small-diameter distal optical system unit 19 is connected to the relay optical system unit 20 with the attachment mechanism 23, as shown in FIG. 1, to carry out in-vivo examination of the body cavity of the specimen A, such as a small laboratory animal, the small-diameter distal optical system unit 19 can be separated from the relay optical system unit 18 by unlocking the attachment mechanism 23, as shown in FIG. 9, to keep the small-diameter distal optical system unit 19 positioned at the specimen A. This approach is advantageous in that, for another examination at a later time, the same site can be examined merely by re-connecting the relay optical system unit 18 to the positioned small-diameter distal optical system unit 19 with the attachment mechanism 23. Another advantage of this approach is that the specimen A is not damaged because the small-diameter distal optical system unit 19 is not moved relative to the specimen A.

Furthermore, according to the microscope system 1 of this embodiment, the attachment mechanism 23 locks the small-diameter distal optical system unit 19 and the relay optical system unit 18 such that they do not turn relative to each other. This means that the small-diameter distal optical system unit 19 can be connected to the relay optical system unit 18 without having to turn the small-diameter distal optical system unit 19 positioned at the specimen A, at whatever rotational angle position the relay optical system unit 18 is set. As a result, the specimen A is not damaged.

Figure 10:
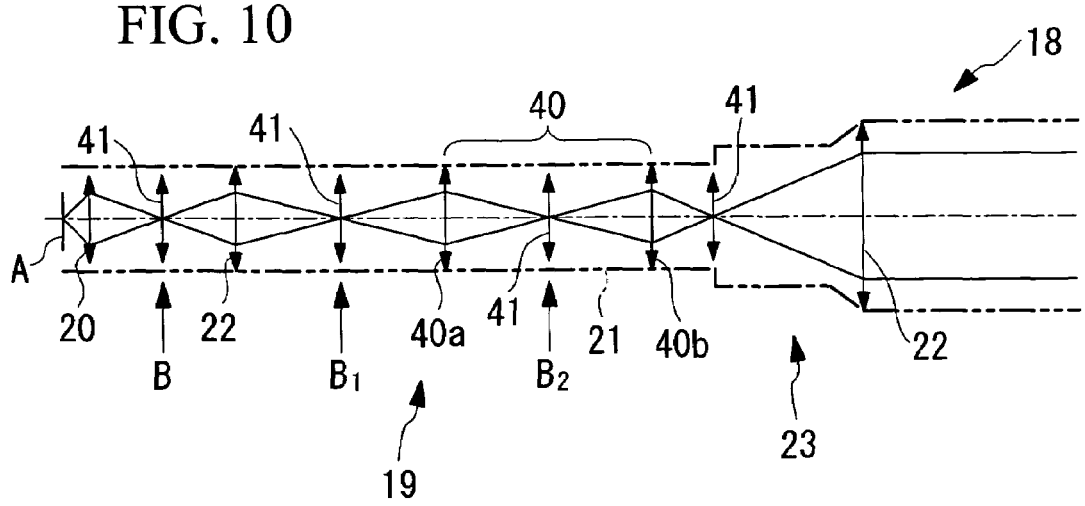
FIG. 10 is a schematic diagram depicting a modification of the objective unit in FIGS. 2A and 2B, where an extension optical system is provided.

Although the small-diameter distal optical system unit 19 is attachable/detachable to/from the relay optical system unit 18 using the attachment mechanism 23 on the objective unit 3 according to this embodiment, the small-diameter distal optical system unit 19 may be integrated with the relay optical system unit 18 without providing the attachment mechanism 23. Furthermore, an extension optical system 40, as shown in FIG. 10, may be arranged between the small-diameter distal optical system unit 19 and the relay optical system unit 18. The extension optical system 40 includes in the outer cylinder 21 a plurality of relay lenses 40a and 40b and pupil relay lenses 41 for re-focusing the light of the first intermediate image B formed by the small-diameter distal optical system 20 to form one or more other intermediate images B1 and B2.

According to the objective unit 3 with the above-described structure, light propagates such that the plurality of intermediate images B1 and B2 are formed along the optical axis direction due to the operation of the extension optical system 40, and hence the overall length of the small-diameter distal optical system 20 can be increased. Consequently, even an object existing at a deep site, such as an organ of a small laboratory animal, is accessible by the tip 19a of the small-diameter distal optical system unit 19 merely by providing only a small opening to examine the small laboratory animal in-vivo.

Although the extension optical system 40 is constructed as part of the small-diameter distal optical system unit 19, as shown in FIG. 10, it may be constructed as part of the relay optical system unit 18. Furthermore, the extension optical system 40 may be constructed such that it is attachably/detachably connected to both the relay optical system unit 18 and the small-diameter distal optical system unit 19. If this is the case, a plurality of extension optical systems 40 with different lengths may be prepared, from which an appropriate one is selected depending on the depth of the examination site. Alternatively, a plurality of extension optical systems 40 with a minimum length may be prepared to combine a required number of extension optical systems 40 depending on the depth of the examination site. In addition, GRIN lenses may be used in place of the relay lenses 40a and 40b.

In this manner, a long extension optical system 40 or many extension optical systems 40 are used to examine a site deep within the body cavity, whereas the long extension optical system 40 is removed or a short extension optical system 40 or few extension optical systems 40 are used to examine a shallow site in the body cavity or a site that can be examined from the skin. This allows appropriate examination of examination sites at various depths to be conducted.

A microscope system 50 according to a second embodiment of the present invention will now be described with reference to FIGS. 11 and 12. In the second embodiment, the same components as those of the microscope system 1 according to the first embodiment are denoted with the same reference numerals, and thus will be described only concisely.

Figure 11:
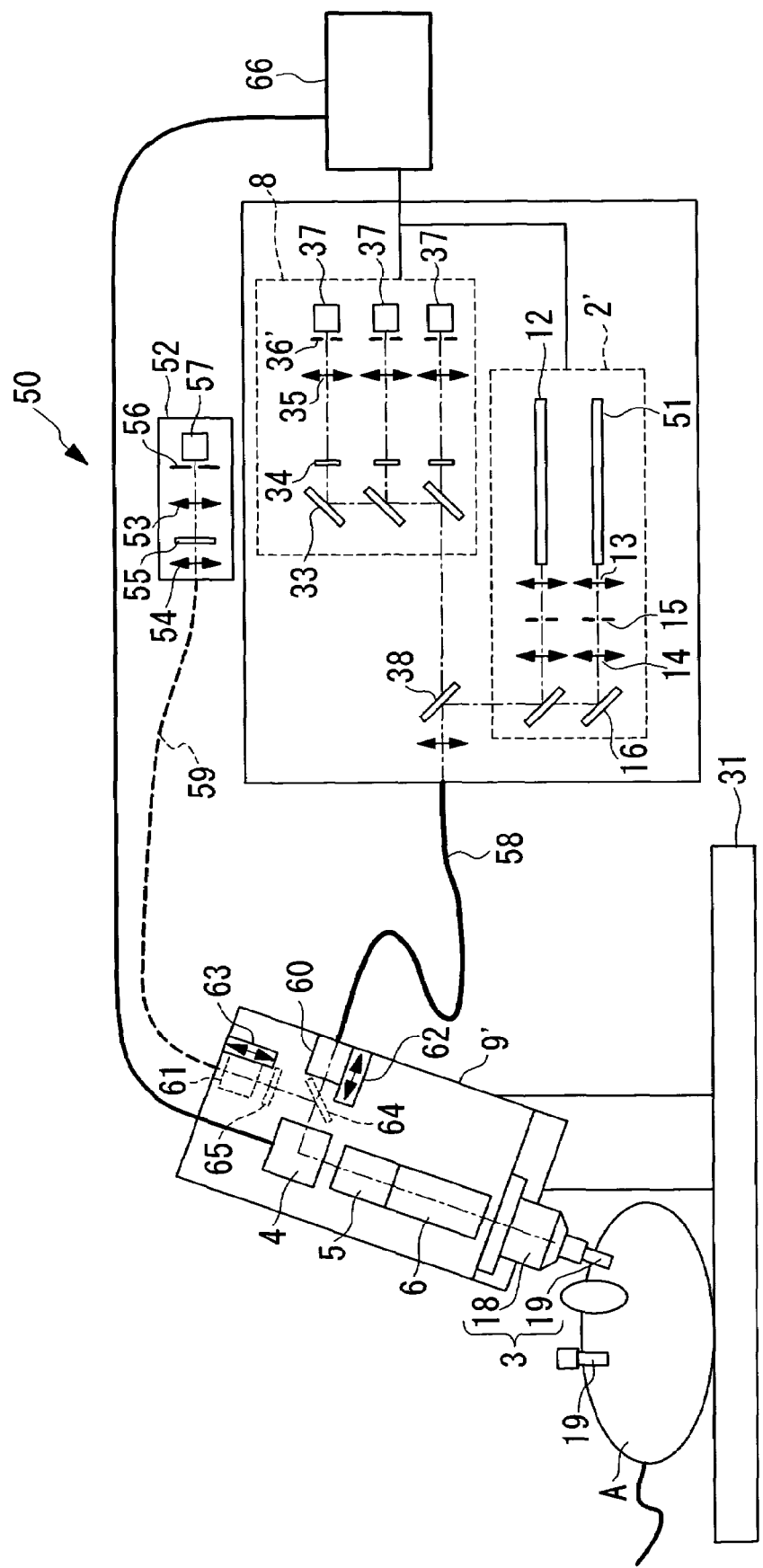
FIG. 11 is a schematic diagram depicting a microscope system according to a second embodiment of the present invention.

Referring to FIG. 11, the microscope system 50 according to the second embodiment is a laser-scanning fluorescence microscope, which differs from the microscope system 1 according to the first embodiment, which functions as a confocal microscope. Thus, the microscope system 50 supports multiphoton-excitation examination. More specifically, a high-output near-infrared femtosecond pulsed laser is included as a laser light source 51. Furthermore, a first detection optical system 8 used for measurement with typical excitation light and a second detection optical system 52 for multiphoton excitation are included.

The first detection optical system 8 includes noise-cutting pinholes 36' in place of the confocal pinholes 36 used in the first embodiment.

The second detection optical system 52 includes a pair composed of collimating lenses 53 and 54; a band-pass filter 55 arranged between the collimating lenses 53 and 54; a noise-cutting pinhole 56 having a sufficiently large pinhole diameter compared with the diffraction diameter; and a photosensor 57.

Furthermore, a microscope main body 9' is separated from a laser light source unit 2', the first detection optical system 8, and the second detection optical system 52. The microscope main body 9' is connected to the second detection optical system 52 with an optical fiber 59, and the microscope main body 9' is connected to the laser light source unit 2' and the first detection optical system 8 with an optical fiber 58. With this structure, the microscope main body 9' is made compact. The microscope main body 9' includes an x-y-θ-φ main-body moving mechanism (not shown in the figure) for adjusting its position in the two-dimensional directions and its angle relative to the specimen A. Furthermore, a collimating optical system 60 for focusing the light deflected in the scanning unit 4 onto the end surface of the optical fiber 58 is included in the microscope main body 9'. The collimating optical system 60 includes a focusing mechanism 62 for adjusting the position of the lens constituting the collimating optical system 60 in the optical axis direction. The microscope main body 9' further contains a dichroic mirror 64 between the collimating optical system 60 and the scanning unit 4 and a barrier filter 65 cutting excitation light for multiphoton-excitation fluoroscopy. A second collimating optical system 61 and a second focusing mechanism 63 for focusing light onto the end surface of the optical fiber 59 are also contained in the microscope main body 9'.

The detecting optical fiber 59 does not need to operate as a confocal pinhole, and is preferably realized by an optical fiber with a sufficiently large core diameter (e.g., a multimode fiber with a large core diameter) compared with the diffraction limit in order to enhance the S/N ratio by ensuring a sufficient amount of transmitted light. In contrast, the end surface of the exciting optical fiber 58 needs to function as a confocal pinhole, and therefore, this fiber 58 is preferably realized by an optical fiber with a core diameter equivalent to about the diffraction limit (e.g., a single-mode fiber or a multimode fiber with a small core diameter). Furthermore, in order to suppress dispersion, a photonic crystal fiber is preferably employed.

In FIG. 11, reference numeral 66 denotes a processing control unit such as a personal computer, and reference numeral 67 denotes a cable. The processing control unit 66 performs switching control between the laser light sources 12 and 51 and wavelength control of the laser light source unit 2'; wavelength selection of the dichroic mirrors 6 and 38, the filter 34, etc.; control of a wavelength-splitting element (not shown in the figure); analysis and display of detected information received by the photosensors 37 and 57 of the detection optical systems 8 and 52; drive control of the scanning unit 4; drive control of the focusing mechanisms 62 and 63; drive control of the x-y-θ-φ main-body moving mechanism; and so on.

Figure 12:
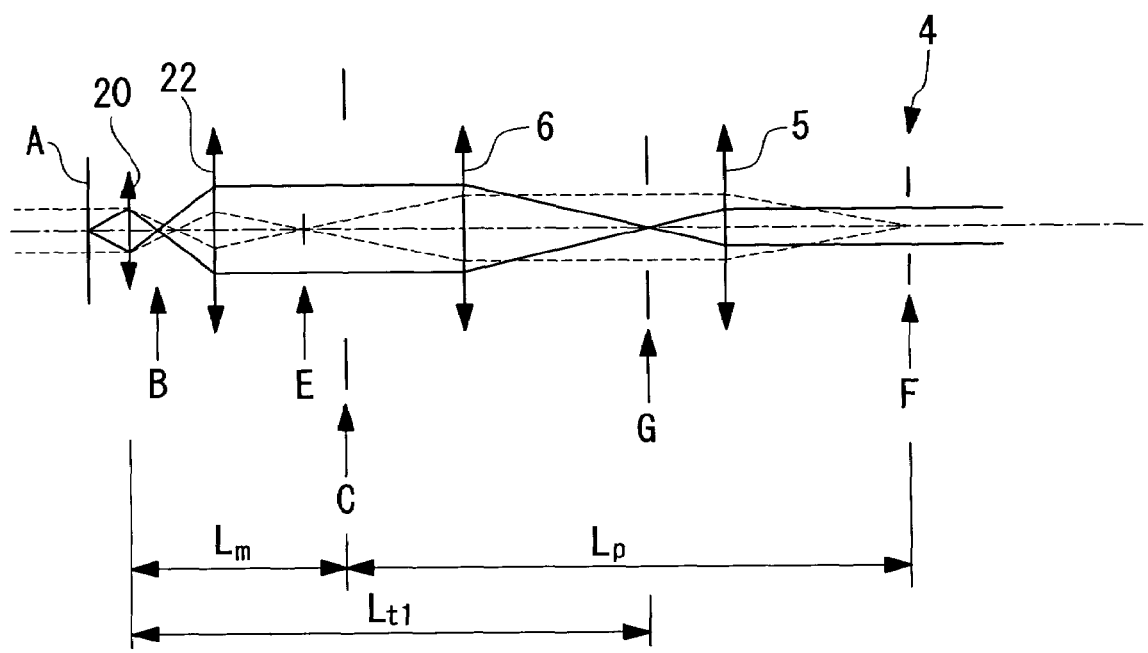
FIG. 12 is a schematic diagram of a light path from the object surface to the scanning unit of the microscope system in FIG. 11.

Referring to FIG. 12, according to this embodiment, the following conditional expression (2) is satisfied:

$$0.15 \leq Lm/Lp \leq 0.5 \quad (2)$$

where Lm represents the distance from the coupling position C of the objective unit 3 to the first intermediate image position B along the optical axis, and Lp represents the distance, along the optical axis, from the coupling position C to a position F that has a conjugate relationship with the back focal position E of the objective optical system 32 through the imaging optical system 6 and the pupil-projection optical system 5.

Instead, the following conditional expression (3) may be satisfied:

$$0.15 \leq Lm/Ltl \leq 0.5 \quad (3)$$

where, Ltl represents the distance, along the optical axis, from the position of the second intermediate image G formed by the imaging optical system 6 to the position of the first intermediate image B.

According to the microscope system 50 of this embodiment, the laser light source unit 2' and the detection optical systems 8 and 52 are provided as separate units from the microscope main body 9', and they are interconnected with the optical fibers 58 and 59. This allows the microscope main body 9' to be freely arranged with respect to the laser light source unit 2' and the detection optical systems 8 and 52. Therefore, not only can the microscope main body 9' be made small enough to examine an object in-vivo, but also the objective unit 3 mounted on the microscope main body 9' can be oriented in any direction appropriate for the examination site.

Furthermore, since the microscope system 50 according to this embodiment is constructed so as to satisfy conditional expression (2) or (3), the distance from the scanning unit 4 to the relay optical system unit 18 can be shortened to make the microscope main body 9' compact. If the upper limit of conditional expression (2) or (3) is exceeded, the focal lengths of the imaging optical system 6 and the pupil-projection optical system 5 become short, which causes the distance between the pupil-projection optical system 5 and the scanning unit 4 to become too short to prevent interference. In contrast, if the lower limit of conditional expression (2) or (3) is not reached, the total length from the specimen A to the scanning unit 4 becomes so long that it is difficult to make the microscope main body 9' compact. Thus, the microscope system 50 according to this embodiment that satisfies conditional expression (2) or (3) is advantageous in that it is free from the shortcoming that would result if conditional expression (2) or (3) were violated.

In addition, due to its compact size, the microscope main body 9' can easily be arranged at any position and angle appropriate for the examination site. In other words, the compact microscope main body 9' can easily be set at an appropriate position even in the case of examination of, for example, a difficult-to-access site deep in the body cavity of a small laboratory animal. Furthermore, due to its compact size, the microscope main body 9' can be freely mounted at any angle. Therefore, even in the case of examination of a difficult-to-access site, examination is possible at an appropriate position and from an appropriate direction (angle). This permits examination to be conducted with less damage to the small laboratory animal.

In addition, according to the microscope system 50 of this embodiment, a femtosecond pulsed laser is used as the laser light source 51, and hence multiphoton-excitation fluoroscopy is possible. As a result, the microscope system 50 according to this embodiment is advantageous in that even in the case of examination of, for example, a site deeper than the surface of an organ existing deep in the body cavity of a small laboratory animal, the interior of the organ can be examined without damaging the organ, i.e., merely by applying the tip 19a of the small-diameter distal optical system unit 19 to the surface of the organ. Also in other cases, the interior of the body can be examined non-invasively, for example, merely by applying the end surface 19a of the small-diameter distal optical system unit 19 to the body surface of a small laboratory animal.

Although the microscope system 50 according to this embodiment includes the second detection optical system 52, the second detection optical system 52 is not necessary if multiphoton-excitation fluoroscopy is not performed.

If this is the case, the microscope main body 9' can be reduced in size by an amount corresponding to the removal/elimination of the second detection optical system 52, and normal fluoroscopy is possible with the more compact microscope main body 9'.

Working examples of the pupil-projection optical system 5, the imaging optical system 6, and the objective optical system 32 in the microscope systems 1 and 50 according to the present invention will now be described. The optical systems according to these working examples are applied to the microscope systems 1 and 50 of the first and second embodiments shown in FIGS. 1 and 11, respectively.

Figure 13:
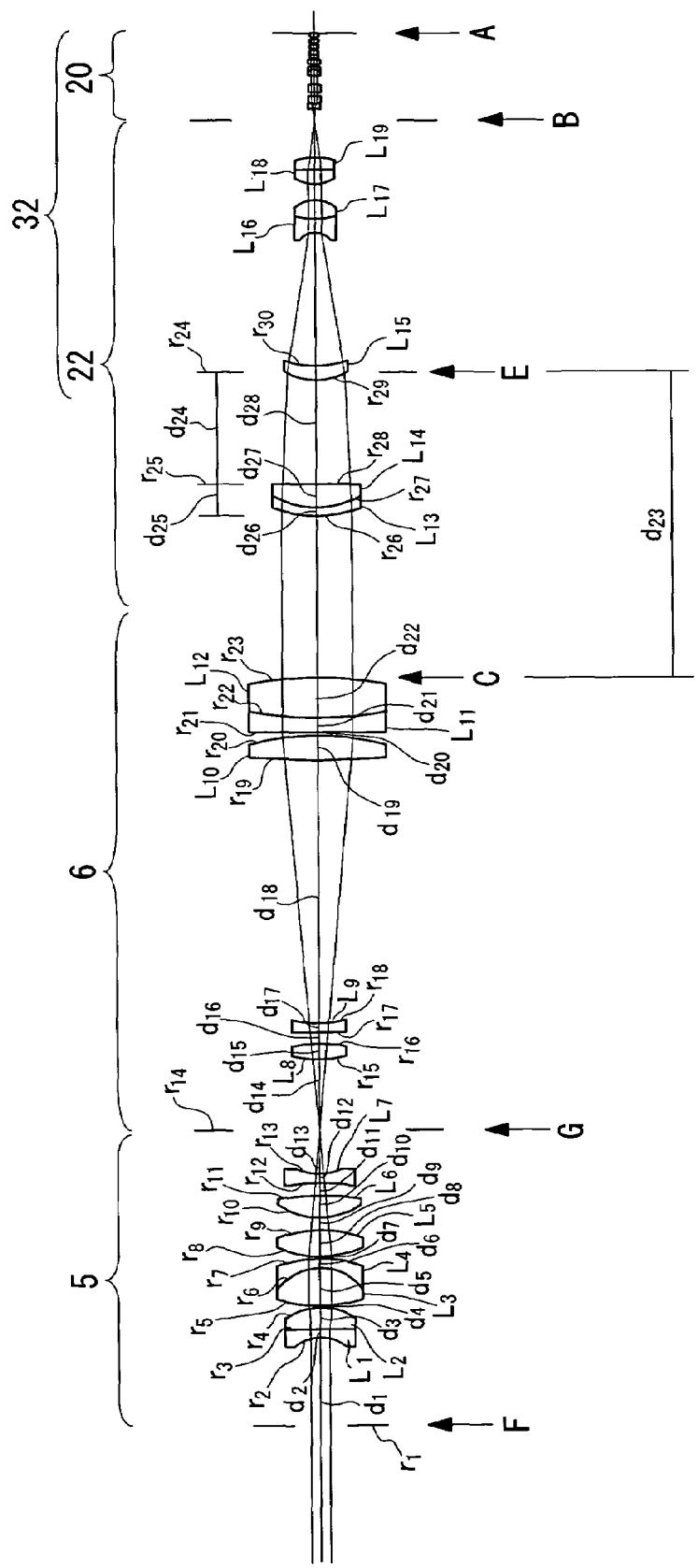
FIG. 13 is a diagram depicting, along the optical axis, the structures of a pupil-projection optical system, an imaging optical system, and an objective optical system in a microscope system according to one working example of the present invention.
Figure 14:
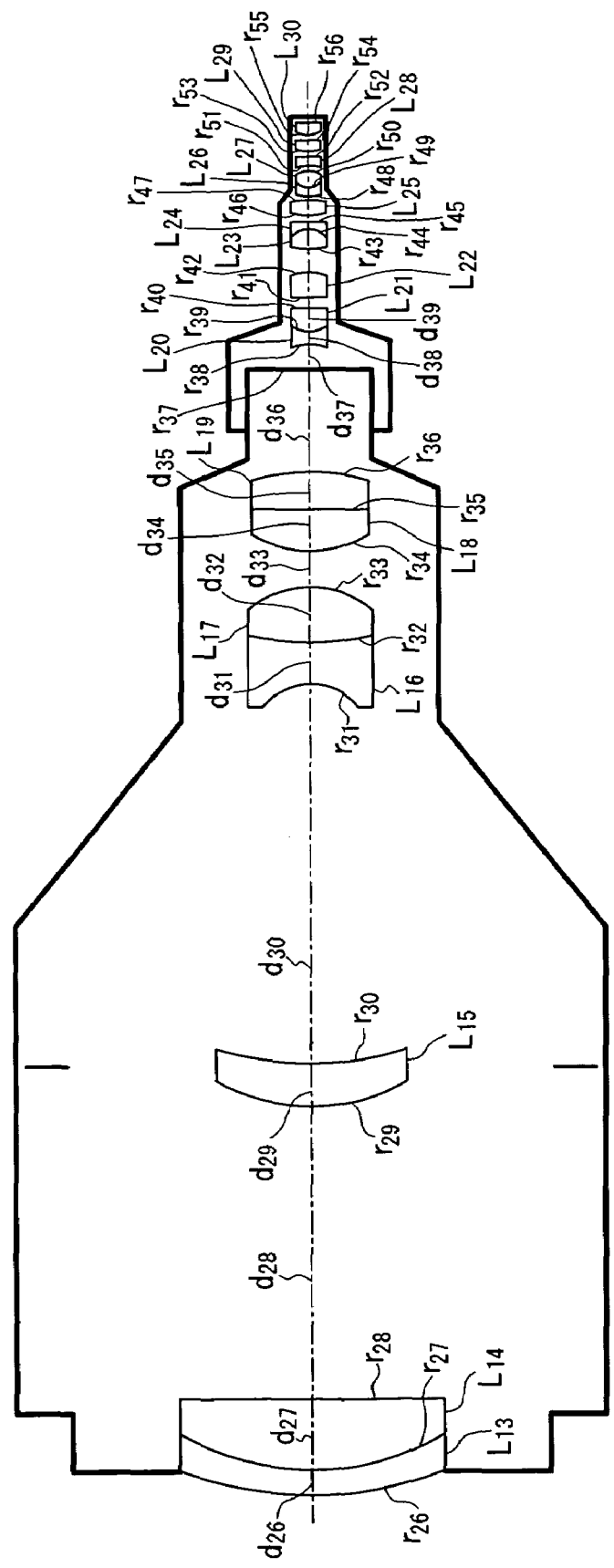
FIG. 14 is an enlarged diagram depicting the objective optical system in FIG. 13.

FIG. 13 is a diagram depicting, along the optical axis, the structures of the pupil-projection optical system 5, the imaging optical system 6, and the objective optical system 32 used in the microscope systems 1 and 50 according to a working example of the present invention. FIG. 14 is an enlarged diagram depicting the objective optical system 32 in FIG. 13.

Referring to FIG. 13, in the microscope systems 1 and 50 according to this working example, the pupil-projection optical system 5 includes a low-power positive compound lens formed of a planoconcave lens $L_1$ with the concave surface facing the scanning unit 4 and a planoconvex lens $L_2$ with the convex surface facing the second intermediate image G; a positive compound lens formed of a biconvex lens $L_3$ and a negative meniscus lens $L_4$ with the concave surface facing the scanning unit 4; biconvex lenses $L_5$ and $L_6$; and a biconcave lens $L_7$ in that order from the scanning unit 4 (from the left in the figure).

The imaging optical system 6 includes a front lens group and a rear lens group in that order from the second intermediate image G. The front lens group includes a biconvex lens $L_8$ and a planoconcave lens $L_9$ with the flat surface facing the second intermediate image G in that order from the second intermediate image G. The rear lens group includes a biconvex lens $L_{10}$ and a positive compound lens formed of a planoconcave lens $L_{11}$ with the concave surface facing the specimen A and a biconvex lens $L_{12}$ in that order from the second intermediate image G.

Referring to FIG. 14, the objective optical system 32 includes the relay optical system 22 and the small-diameter distal optical system 20. The relay optical system 22 includes a positive compound lens formed of a negative meniscus lens $L_{13}$ with the convex surface facing the second intermediate image G and a planoconvex lens $L_{14}$ with the convex surface facing the second intermediate image G; a positive meniscus lens $L_{15}$ with the convex surface facing the second intermediate image G; a positive compound lens formed of a biconcave lens $L_{16}$ and a biconvex lens $L_{17}$; and a positive compound lens formed of two planoconvex lenses $L_{18}$ and $L_{19}$ in that order from the second intermediate image G. The small-diameter distal optical system 20 includes a negative compound lens formed of a biconcave lens $L_{20}$ and a planoconvex lens $L_{21}$ with the convex surface facing the first intermediate image B; a planoconvex lens $L_{22}$ with the flat surface facing the first intermediate image B; a positive compound lens formed of a biconvex lens $L_{23}$ and a negative meniscus lens $L_{24}$; a biconvex lens $L_{25}$; a positive compound lens formed of a biconcave lens $L_{26}$ and a biconvex lens $L_{27}$; a planoconcave lens $L_{28}$ with the concave surface facing the first intermediate image B; a biconvex lens $L_{29}$; and a planoconvex lens $L_{30}$ with the flat surface facing the specimen A, in that order from the first intermediate image B.

Tables 1 and 2 show numeric data of the optical members $L_1$ to $L_{30}$ constituting the optical systems according to the above-described working example. In this numeric data, symbol r denotes the radius of curvature of the lens surface, symbol d denotes the thickness or air space of the lens measured on the axis, nd denotes the refractive index of the lens at the d-line, and vd denotes the Abbe number of the lens. The first surface is a pupil conjugate position F of the objective optical system 32, where a beam from an object at infinity enters. Numeric figures followed by U indicate an effective diameter of the lens.

TABLE 1

| | r | d | nd | vd | U |
|---|---|---|---|---|---|
| 1 | ∞(conjugate plane) | 10.6 | | | 1.070 |
| 2 | −4.623 | 1 | 1.48749 | 70.23 | 1.395 |
| 3 | ∞ | 3 | 1.497 | 81.54 | 1.547 |
| 4 | −6.021 | 0.2 | | | 1.882 |

TABLE 1-continued

| | r | d | nd | vd | U |
|---|---|---|---|---|---|
| 5 | 30.762 | 4.31 | 1.43875 | 94.93 | 1.896 |
| 6 | −6.181 | 1.1 | 1.7725 | 49.6 | 1.889 |
| 7 | −15.671 | 0.2 | | | 1.963 |
| 8 | 15.223 | 3.24 | 1.43875 | 94.93 | 1.966 |
| 9 | −15.223 | 1.42 | | | 1.860 |
| 10 | 8.835 | 2.63 | 1.497 | 81.54 | 1.681 |
| 11 | −33.393 | 1.6699 | | | 1.351 |
| 12 | −15.554 | 1 | 1.741 | 52.64 | 0.974 |
| 13 | 7.459 | 5.363 | | | 0.866 |
| 14 | ∞(2nd intermediate image) | 9 | | | 0.403 |
| 15 | 40.55 | 1.59 | 1.48749 | 70.23 | 1.003 |
| 16 | −18.93 | 1.29 | | | 1.069 |
| 17 | ∞ | 1.2 | 1.48749 | 70.23 | 1.116 |
| 18 | 12.608 | 32.2683 | | | 1.146 |
| 19 | 97.144 | 2.9 | 1.43875 | 94.93 | 3.997 |
| 20 | −28.867 | 0.25 | | | 4.121 |
| 21 | ∞ | 1.85 | 1.741 | 52.64 | 4.125 |
| 22 | 29.63 | 5.04 | 1.43875 | 94.93 | 4.136 |
| 23 | −34.904 | 38.048 | | | 4.303 |
| 24 | ∞ | −14.632 | | | 4.447 |
| 25 | ∞(coupling position) | −3.45 | | | 4.388 |
| 26 | 18.004 | 1 | 1.7725 | 49.6 | 4.377 |
| 27 | 10.967 | 3 | 1.43875 | 94.93 | 4.237 |
| 28 | ∞ | 12.38 | | | 4.161 |
| 29 | 7.772 | 1.8 | 1.43875 | 94.93 | 3.486 |
| 30 | 13.251 | 16.33 | | | 3.234 |

TABLE 2

| | r | d | nd | vd | U |
|---|---|---|---|---|---|
| 31 | −2.461 | 1.63 | 1.6779 | 55.34 | 0.871 |
| 32 | 7.721 | 2.5 | 1.43875 | 94.93 | 0.997 |
| 33 | −3.501 | 1.5 | | | 1.224 |
| 34 | 5.772 | 1.8 | 1.43875 | 94.93 | 1.196 |
| 35 | ∞ | 1.48 | 1.51633 | 64.14 | 1.071 |
| 36 | −12.005 | 4.524 | | | 0.970 |
| 37 | ∞(2nd intermediate image) | 1.02 | | | 0.281 |
| 38 | −1.869 | 0.51 | 1.51633 | 64.14 | 0.347 |
| 39 | 1.425 | 1 | 1.7725 | 49.6 | 0.412 |
| 40 | ∞ | 0.56 | | | 0.457 |
| 41 | ∞ | 1 | 1.7725 | 49.6 | 0.504 |
| 42 | −3.746 | 1.03 | | | 0.549 |
| 43 | 10.104 | 0.8 | 1.6779 | 55.34 | 0.536 |
| 44 | −0.804 | 0.34 | 1.7725 | 49.6 | 0.519 |
| 45 | −5.961 | 0.2 | | | 0.528 |
| 46 | 2.681 | 0.7 | 1.51633 | 64.14 | 0.520 |
| 47 | −2.406 | 0.2 | | | 0.473 |
| 48 | −2.406 | 0.29 | 1.6134 | 44.27 | 0.425 |
| 49 | 0.674 | 0.7 | 1.43875 | 94.93 | 0.394 |
| 50 | −1.218 | 0.15 | | | 0.399 |
| 51 | −3.637 | 0.45 | 1.6134 | 44.27 | 0.387 |
| 52 | ∞ | 0.15 | | | 0.392 |
| 53 | 1.273 | 0.6 | 1.741 | 52.64 | 0.399 |
| 54 | −3.469 | 0.15 | | | 0.342 |
| 55 | 0.614 | 0.55 | 1.51633 | 64.14 | 0.278 |
| 56 | ∞ | 0.1 | 1.33304 | 55.79 | 0.108 |
| 57 | ∞(object plane) | | | | |

Numeric parameters used for conditional expressions for microscope systems according to the above-described ing example are shown in Tables 3 and 4.

TABLE 3

|  |  | Focal length | Magnification | Numerical aperture |
|---|---|---|---|---|
| Pupil-projection optical system | | 12.02159 | | |
| Imaging optical system | | 50.00 | — | 0.086 (2nd intermediate image position) |
| Objective optical system | Relay optical system | 34.93 | −1.43 (relay optical system + imaging optical system) | 0.123 (intermediate image position) |
| | Small-diameter distal optical system | 2.92 | −3.99 (small-diameter distal optical system only) | 0.49 (object side) |
| Overall | Overall | | 5.71 (objective optical system + imaging optical system) | |

TABLE 4

| | |
|---|---|
| Diameter at coupling position Da | 20.32 |
| Tip outer diameter Df | 1.3 |
| Coupling position to 2nd intermediate image Lm | 44.49 |
| Pupil to coupling position Lp | 129.17 |
| Distance between two intermediate images Ltl | 123.30 |
| Conditional expression (1) Df/Da ≦ 0.3 | 0.064 |
| Conditional expression (2) 0.15 ≦ Lm/Lp ≦ 0.5 | 0.344 |
| Conditional expression (3) 0.15 ≦ Lm/Ltl ≦ 0.5 | 0.361 |

Another embodiment of the relay optical system, which is an objective optical system designed in an infinity system, and the relay optical system unit included in the objective unit according to the present invention will now be described with reference to FIG. 15.

Figure 15:
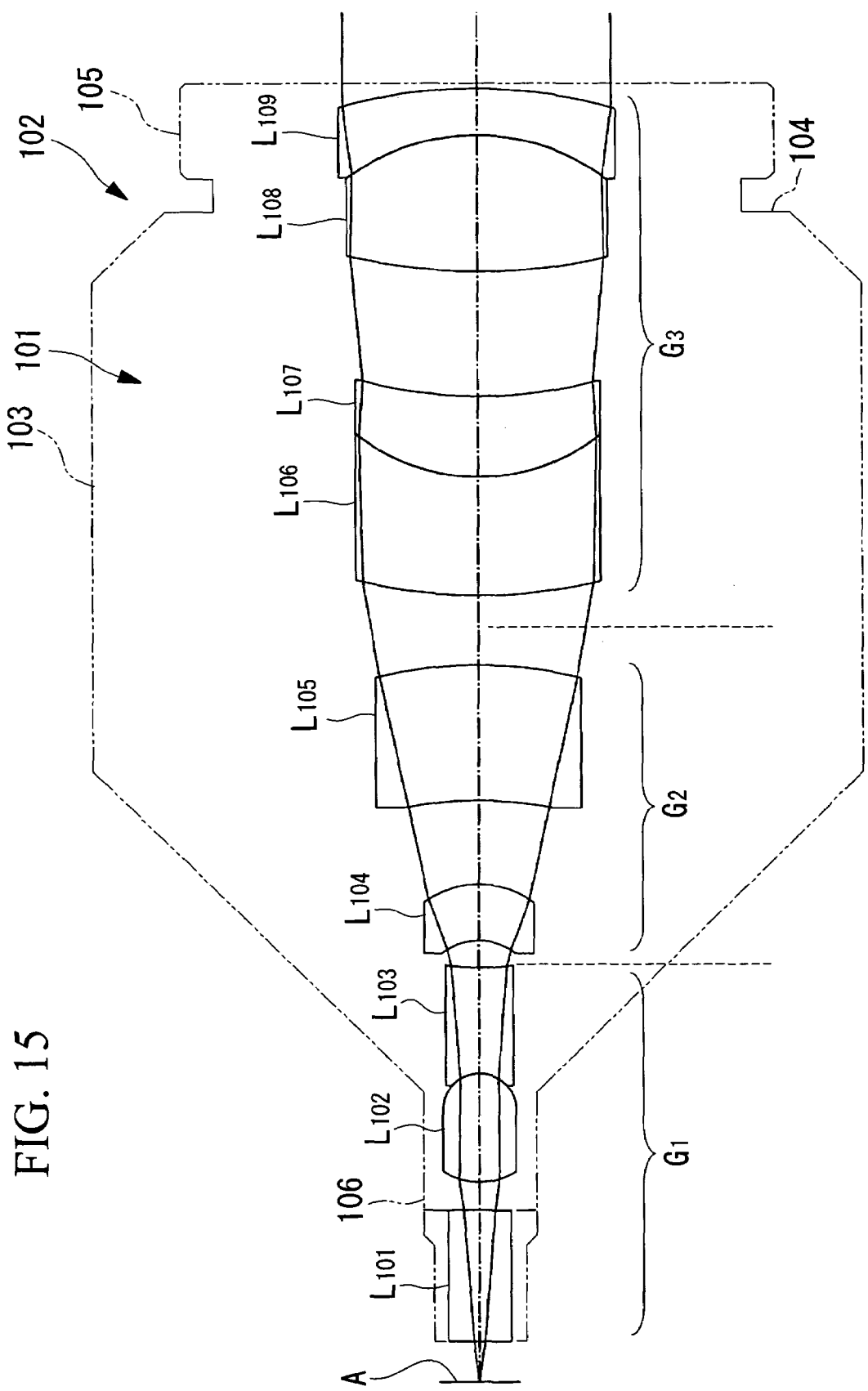
FIG. 15 is a diagram depicting a relay optical system and a relay optical system unit according to another embodiment of the present invention.

Referring to FIG. 15, a relay optical system 101 according to this embodiment is arranged in a barrel 103. The barrel 103 contains a threaded mount 105 provided at a coupling position 104 for mounting the barrel 103 on the microscope main body (not shown in the figure) and a small-diameter distal section 106 arranged at the tip thereof, which is brought near to or into contact with the specimen A. The relay optical system 101 according to this embodiment and the barrel 103 for housing the relay optical system 101 together constitute a relay optical system unit 102 according to this embodiment.

The relay optical system 101 according to this embodiment includes a first lens group $G_1$, a second lens group $G_2$, and a third lens group $G_3$ in that order from the small-diameter distal section 106 (object side) to the coupling position 104 (image side).

The first lens group $G_1$ includes a parallel plate $L_{101}$ and exhibits positive refractive power as a whole.

The second lens group $G_2$ includes meniscus lenses $L_{104}$ and $L_{105}$ with their concave surfaces facing the object side, and exhibits negative refractive power as a whole.

The third lens group $G_3$ includes one compound lens composed of lenses $L_{106}$ and $L_{107}$ and another compound lens composed of lenses $L_{108}$ and $L_{191}$ and exhibits positive refractive power as a whole.

The relay optical system 101 and the relay optical system unit 102 of this embodiment, with the above-described structure, are compatible with a standard microscope objective unit due to the threaded mount 105 provided at the coupling position 104 for mounting to the microscope main body. Furthermore, due to the small-diameter distal section 106 arranged at the tip, which is brought near to or into contact with the specimen A serving as an object to be examined, the small parallel plate $L_{101}$ (optical system) can access the specimen A. In this manner, even an object existing at a deep site in a small laboratory animal can be examined without having to make a large incision in the skin or muscular tissue, i.e., merely by providing only a small opening and inserting the parallel plate $L_{101}$ through the opening. As a result, the small laboratory animal can be examined in-vivo over a long period of time without causing significant damage to the small laboratory animal.

In this case, the first lens group $G_1$ is so small in diameter that a ray with a small ray height coming from the object point is made to converge while maintaining the small ray height with high refractive power to guide the ray into the second lens group $G_2$. Furthermore, providing an optical system with no refractive power, such as the parallel plate $L_{101}$, is effective in making the first lens group $G_1$ long.

In order to make the portion of the first lens group $G_1$ thin, the focal length of the first lens group $G_1$ needs to be made relatively small and the refractive power needs to be high. However, connecting an imaging lens of the microscope system directly after the first lens group $G_1$ with a small focal length causes the magnification to be high, leading to a small examination area. To overcome this problem, the second lens group $G_2$ is given negative refractive power to increase the focal length of the entire relay optical system 101. This allows the magnification to be decreased and hence the examination area to be widened.

In this case, the second lens group $G_2$ exhibits the feature of a quasi-aplanatic meniscus lens due to the included meniscus lenses $L_{104}$ and $L_{105}$ with their concave surfaces facing the object side. With this second lens group $G_2$, the spherical aberration and coma can be suppressed despite a large incident angle of rays.

The third lens group $G_3$ is given positive refractive power to achieve afocal outgoing beam, and, with the concave power of the interface, can satisfactorily correct various types of aberration, such as spherical aberration and chromatic aberration, that cannot be corrected with the first and second lens groups $G_1$ and $G_2$.

In this embodiment, it is preferable that the following conditional expressions (4) to (7) be satisfied:

$$0.25 < F_1/F_T < 0.35 \quad (4)$$

$$0.5 < LG_1 \cdot n_1/L < 0.6 \quad (5)$$

$$0.15 < |F_2/F_T| - |t_2/R_{12}| < 0.45 \quad (6)$$

$$0.01 < |F_1^2 \cdot NA/(F_2 - F_T)| < 0.03 \quad (7)$$

where $F_T$ represents the focal length of the overall relay optical system 101; $F_1$ represents the focal length of the first lens group $G_1$; $F_2$ represents the focal length of the second lens group $G_2$; $LG_1$ represents the distance from the object surface to the last surface of the first lens group $G_1$; L represents the distance from the object plane to the last surface of the relay optical system 101; $n_1$ represents the highest refractive index from among those of the lenses in the first lens group $G_1$; NA represents the numerical aperture of the relay optical system 101; $R_{12}$ represents the image-side radius of curvature of the lens located closest to the image side from among the first lens group $G_1$; $t_2$ represents the distance between the image-side surface of the lens located closest to the image side in the first lens group $G_1$ and the image-side surface of the lens located closest to the image side in the second lens group $G_2$.

Furthermore, when a small-diameter distal optical system brought near to or into contact with a specimen is to be arranged at the tip of the relay optical system 101, it is preferable that the following conditional expression (8) be satisfied:

$$95 < F_1/(\phi_{ob} \cdot NA_{ob}) < 115 \quad (8)$$

where $\phi_{ob}$ represents an area that can be examined with the small-diameter distal optical system, and $NA_{ob}$ represents the object-side numerical aperture of the small-diameter distal optical system.

WORKING EXAMPLES

Working examples of the relay optical system 101 according to this embodiment will now be described with reference to FIGS. 16, 17, 18A to 18D, 19, 20A to 20D, 21, 22A to 22D, 23, and 24A to 24D.

In the first to fourth working examples, the object-side pupil position is infinity. Furthermore, since a satisfactory degree of aberration is ensured up to the near-infrared region, not only the skin of the specimen but also the interior of the specimen can be examined with relatively small scattering by the use of near-infrared light. In addition, the embodiments of the relay optical system 101 can be used for two-photon excitation.

Figure 16:
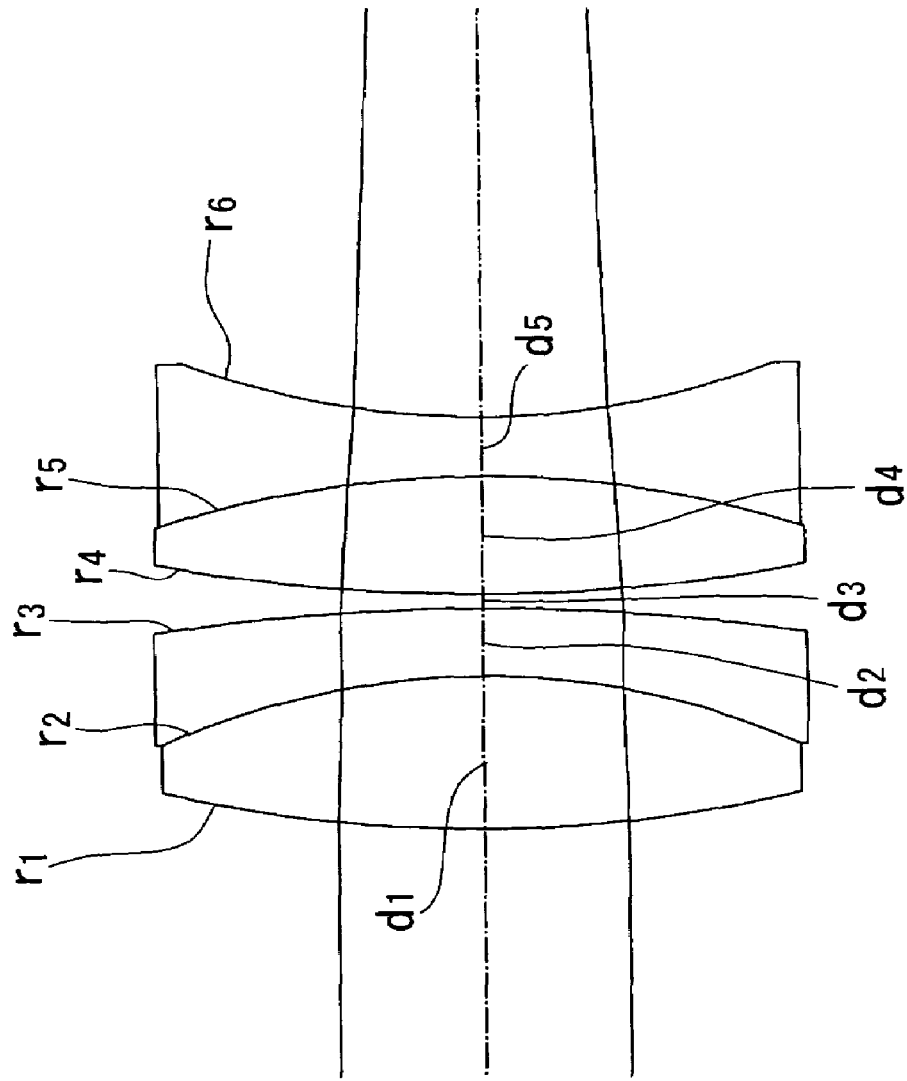
FIG. 16 is a cross-sectional view of one example of an imaging lens used with the relay optical system in FIG. 15.

In the following working examples, since the relay optical system 101 is an infinity-corrected objective lens where light projected toward the image side from the objective unit forms a collimated beam, it does not form an image by itself. For this reason, the relay optical system 101 is used in combination with, for example, an imaging lens (focal length 180 mm) whose lens data is shown in Table 5 and whose cross-sectional view is shown in FIG. 16.

TABLE 5

| | r | d | nd | vd |
|---|---|---|---|---|
| Object side | | | | |
| 1 | 68.7541 | 7.7321 | 1.48749 | 70.21 |
| 2 | −37.5679 | 3.4742 | 1.8061 | 40.95 |

TABLE 5-continued

| | r | d | nd | vd |
|---|---|---|---|---|
| 3 | −102.848 | 0.6973 | | |
| 4 | 84.3099 | 6.0238 | 1.834 | 37.17 |
| 5 | −50.71 | 3.0298 | 1.6445 | 40.82 |
| 6 | 40.6619 | | | |
| Image side | | | | |

In Tables 5 to 9, symbol r represents the radius of curvature, symbol d represents the inter-surface distance, symbol nd represents the refractive index at the d-line (587.56 nm), and symbol vd represents the Abbe number. Here, surface numbers are assigned to increase from the object side to the image side.

In this case, the distance between the relay optical system according to the working examples and the imaging lens may be any value from 50 mm to 170 mm. In the aberration diagrams shown in FIGS. 18A to 18D, 20A to 20D, 22A to 22D, and 24A to 24D, this distance is set at 120 mm.

FIGS. 18A, 20A, 22A, and 24A illustrate spherical aberration. FIGS. 18B, 20B, 22B, and 24B illustrate deviation from the sine condition (OSC'). FIGS. 18C, 20C, 22C, and 24C illustrate astigmatism. FIGS. 18D, 20D, 22D, and 24D illustrate distortion. Y represents the height of the object, and NA represents the numerical aperture. In the astigmatism drawings (i.e., FIGS. 18C, 20C, 22C, and 24C), solid lines indicate a sagittal image plane, and broken lines indicate a meridional image plane.

First Working Example

According to this working example, since the small-diameter distal section in the first lens group $G_1$ is relatively long, measuring about 14 mm, it is suitable for in-vivo examination.

Figure 17:
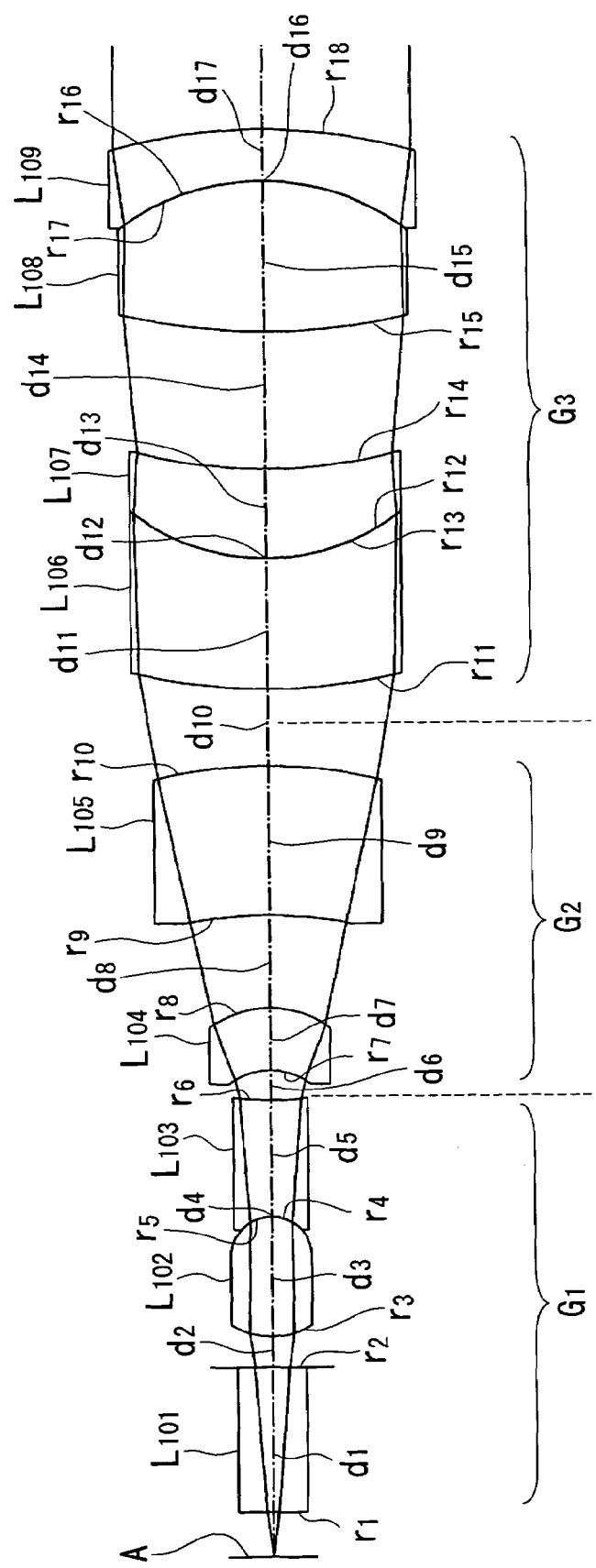
FIG. 17 is a cross-sectional view of a first working example of the relay optical system in FIG. 15.
Figure 18:
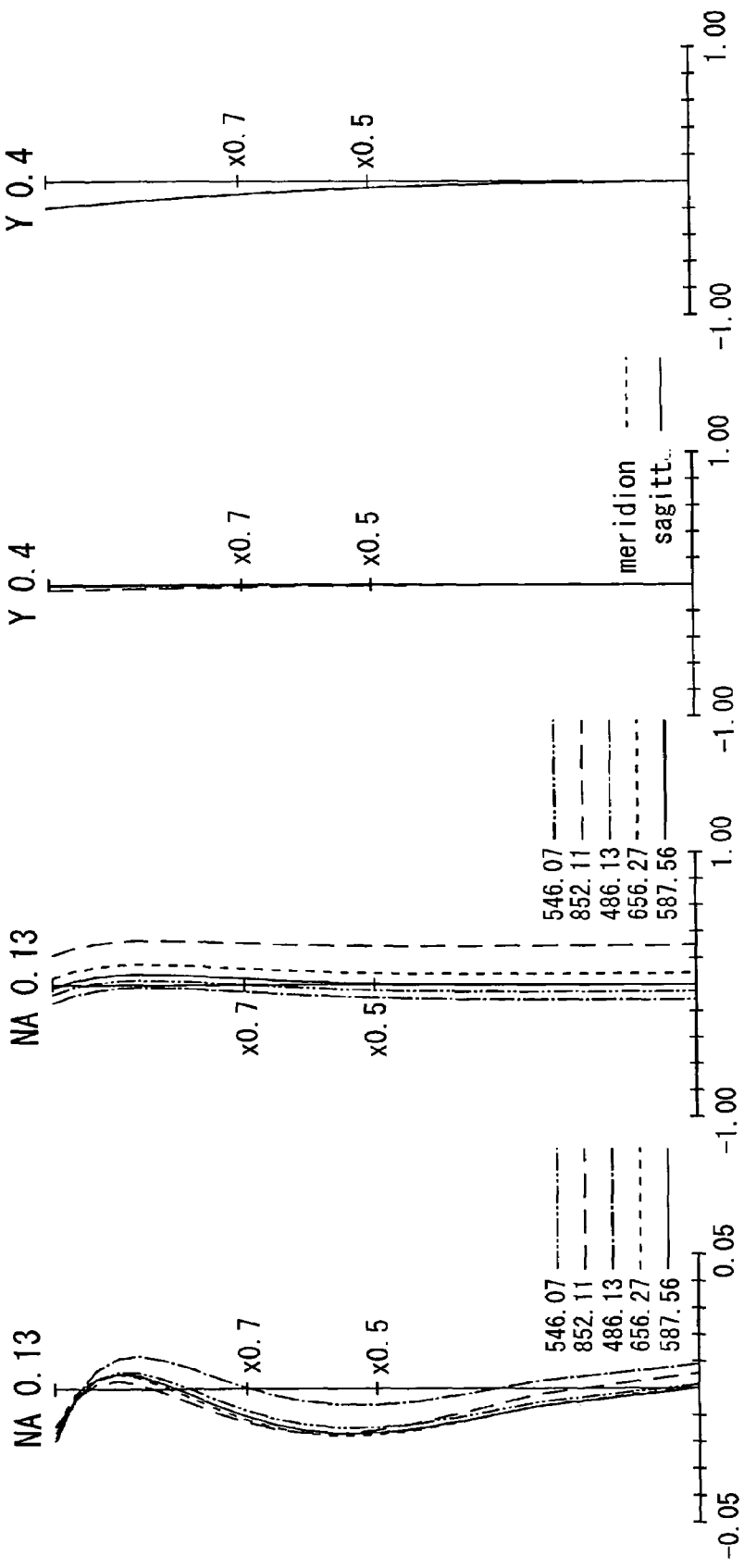
FIGS. 18A to 18D are diagrams depicting aberrations of the system shown in FIG. 17, where

Regarding the relay optical system 101 according to this working example, lens data is shown in Table 6, a cross-sectional view is shown in FIG. 17, and aberration diagrams are shown in FIGS. 18A to 18D.

The relay optical system 101 according to this working example includes a first lens component formed of a parallel plate $L_{101}$; a second lens component with positive refractive power, which is a compound lens of a biconvex lens $L_{102}$ and a biconcave lens $L_{103}$; a third lens component formed of a negative meniscus lens $L_{104}$; a fourth lens component formed of a positive meniscus lens $L_{105}$; a fifth lens component with positive refractive power, which is a compound lens of a negative meniscus lens $L_{106}$ and a positive meniscus lens $L_{107}$; and a sixth lens component with positive refractive power, which is a compound lens of a biconvex lens $L_{108}$ and a negative meniscus lens $L_{109}$. The first lens component and the second lens component constitute the first lens group $G_1$, the third lens component and the fourth lens component constitute the second lens group $G_2$, and the fifth lens component and the sixth lens component constitute the third lens group $G_3$.

TABLE 6

| | r | d | nd | vd |
|---|---|---|---|---|
| Object side | | | | |
| 1 | ∞ | 4.8 | 1.7725 | 49.6 |
| 2 | ∞ | 1.035 | | |
| 3 | 2.2542 | 4 | 1.43875 | 94.93 |

TABLE 6-continued

| | r | d | nd | νd |
|---|---|---|---|---|
| 4 | −1.2656 | 0.012 | 1.56444 | 43.79 |
| 5 | −1.2656 | 3.9 | 1.6779 | 55.34 |
| 6 | 7.2781 | 1 | | |
| 7 | −2.037 | 2.1 | 1.43875 | 94.93 |
| 8 | −3.0241 | 3.1148 | | |
| 9 | −12.4194 | 5.0573 | 1.7725 | 49.6 |
| 10 | −13.8915 | 2.5936 | | |
| 11 | 16.8618 | 4.3875 | 1.51633 | 64.14 |
| 12 | 6.4664 | 0.012 | 1.56444 | 43.79 |
| 13 | 6.4664 | 3 | 1.6779 | 55.34 |
| 14 | 15 | 4.6055 | | |
| 15 | 18.4963 | 5 | 1.43875 | 94.93 |
| 16 | −7.1858 | 0.012 | 1.56444 | 43.79 |
| 17 | −7.1858 | 1.7 | 1.7725 | 49.6 |
| 18 | −16.5908 | | | |
| Image side | | | | |

In this working example, the parameters in conditional expressions (4) to (6) are as shown below.

$F_T = 36.01$ $F_1 = 11.26$ $F_2 = -61.67$ $L = 47.83$ $LG_1 = 15.25$ $t_2 = 11.27$ $F_1/F_T = 0.313$ $LG_1 * n_1/L = 0.526$ $|F_2/F_{T} - t_2/R_{12}| = 0.164$

Second Working Example

In the second working example, since the second lens group $G_2$ is formed as a compound lens, the area of the lens exposed to air is decreased compared with that in the first working example, and hence light transmittance is increased.

Figure 19:
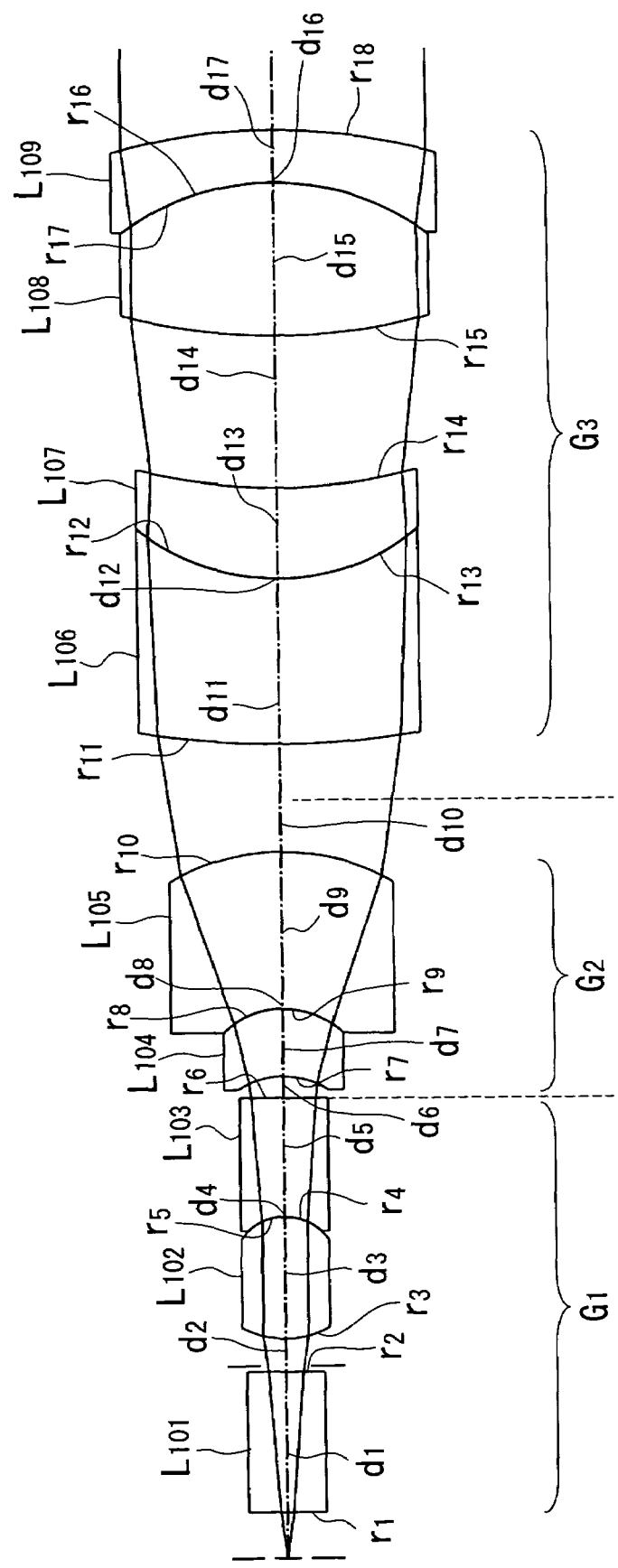
FIG. 19 is a cross-sectional view of a second working example of the relay optical system in FIG. 15.
Figure 20:
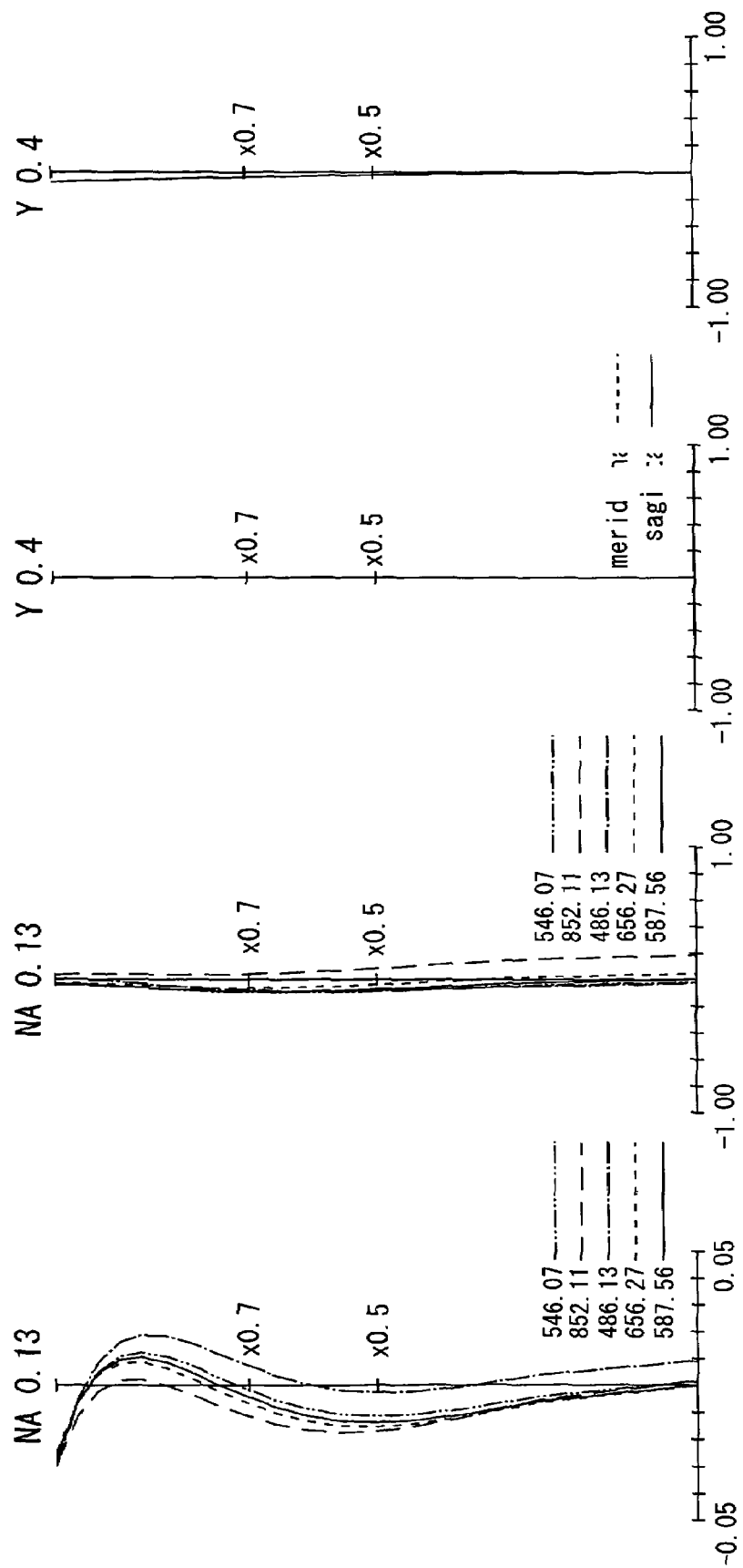
FIGS. 20A to 20D are diagrams depicting aberrations of the system shown in FIG. 19, where

Regarding the relay optical system 101 according to this working example, lens data is shown in Table 7, a cross-sectional view is shown in FIG. 19, and aberration diagrams are shown in FIGS. 20A to 20D.

The relay optical system 101 according to this working example includes a first lens component formed of a parallel plate $L_{101}$; a second lens component with positive refractive power, which is a compound lens of a biconvex lens $L_{102}$ and a planoconcave lens $L_{103}$; a third lens component with negative refractive power, which is a compound lens of a positive meniscus lens $L_{104}$ and a negative meniscus lens $L_{105}$; a fourth lens component with positive refractive power, which is a compound lens of a negative meniscus lens $L_{106}$ and a positive meniscus lens $L_{107}$; and a fifth lens component with positive refractive power, which is a compound lens of a biconvex lens $L_{108}$ and a negative meniscus lens $L_{19}$. The first lens component and the second lens component constitute the first lens group $G_1$, the third lens component constitutes the second lens group $G_2$, and the fourth lens component and the fifth lens component constitute the third lens group $G_3$.

TABLE 7

| | r | d | nd | νd |
|---|---|---|---|---|
| Object side | | | | |
| 1 | ∞ | 4.5798 | 1.7725 | 49.6 |
| 2 | ∞ | 0.1883 | | |
| 3 | 2.4769 | 4 | 1.43875 | 94.93 |
| 4 | −1.5118 | 0.012 | 1.56444 | 43.79 |
| 5 | −1.5118 | 3.9 | 1.6779 | 55.34 |
| 6 | ∞ | 0.6873 | | |
| 7 | −2.381 | 2.2477 | 1.43875 | 94.93 |
| 8 | −2.3982 | 0.012 | 1.56444 | 43.79 |
| 9 | −2.3982 | 5.1739 | 1.7725 | 49.6 |
| 11 | 23.4807 | 5.4446 | 1.51633 | 64.14 |
| 12 | 6.1966 | 0.012 | 1.56444 | 43.79 |
| 13 | 6.1966 | 3 | 1.6779 | 55.34 |
| 14 | 15 | 5.0016 | | |
| 15 | 16.2723 | 5 | 1.43875 | 94.93 |
| 16 | −7.1858 | 0.012 | 1.56444 | 43.79 |
| 17 | −7.1858 | 1.7 | 1.7725 | 49.6 |
| 18 | −16.5908 | | | |
| Image side | | | | |

In this working example, the parameters in conditional expressions (4) to (6) are as shown below.

$F_T = 35.99$ $F_1 = 10.32$ $F_2 = -15.27$ $L = 46.96$ $t_2 = 8.12$ $F_1/F_T = 0.287$ $LG_1 * n_1/L = 0.569$ $|F_2/F_{T} - t_2/R_{12}| = 0.424$

Third Working Example

The relay optical system 101 according to a third working example includes a first lens group $G_1$ with positive refractive power and substantially afocal second and third lens groups $G_2$ and $G_3$. Due to the substantially afocal structure, the distal section (small-diameter distal section) of the first lens group $G_1$ and the second lens group $G_2$ can be made thin, and the amount of aberration can be suppressed.

Figure 21:
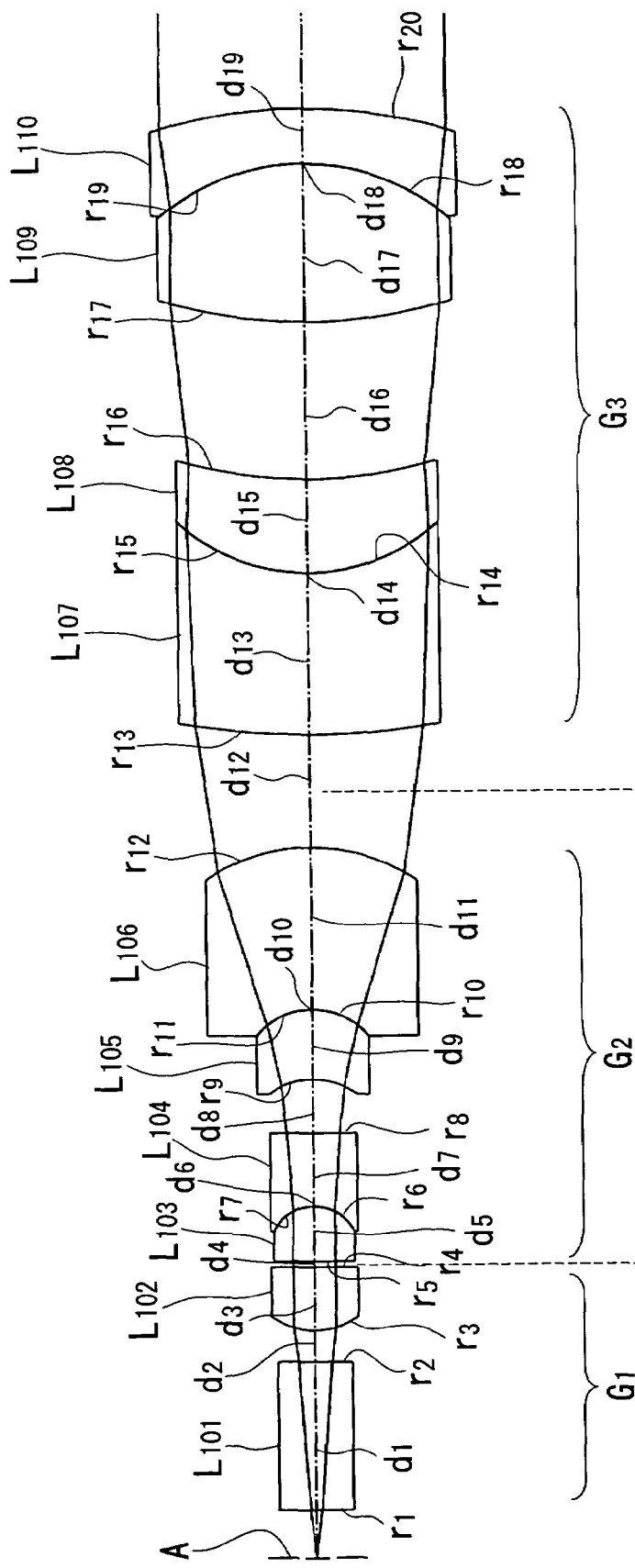
FIG. 21 is a cross-sectional view of a third working example of the relay optical system in FIG. 15.
Figure 22:
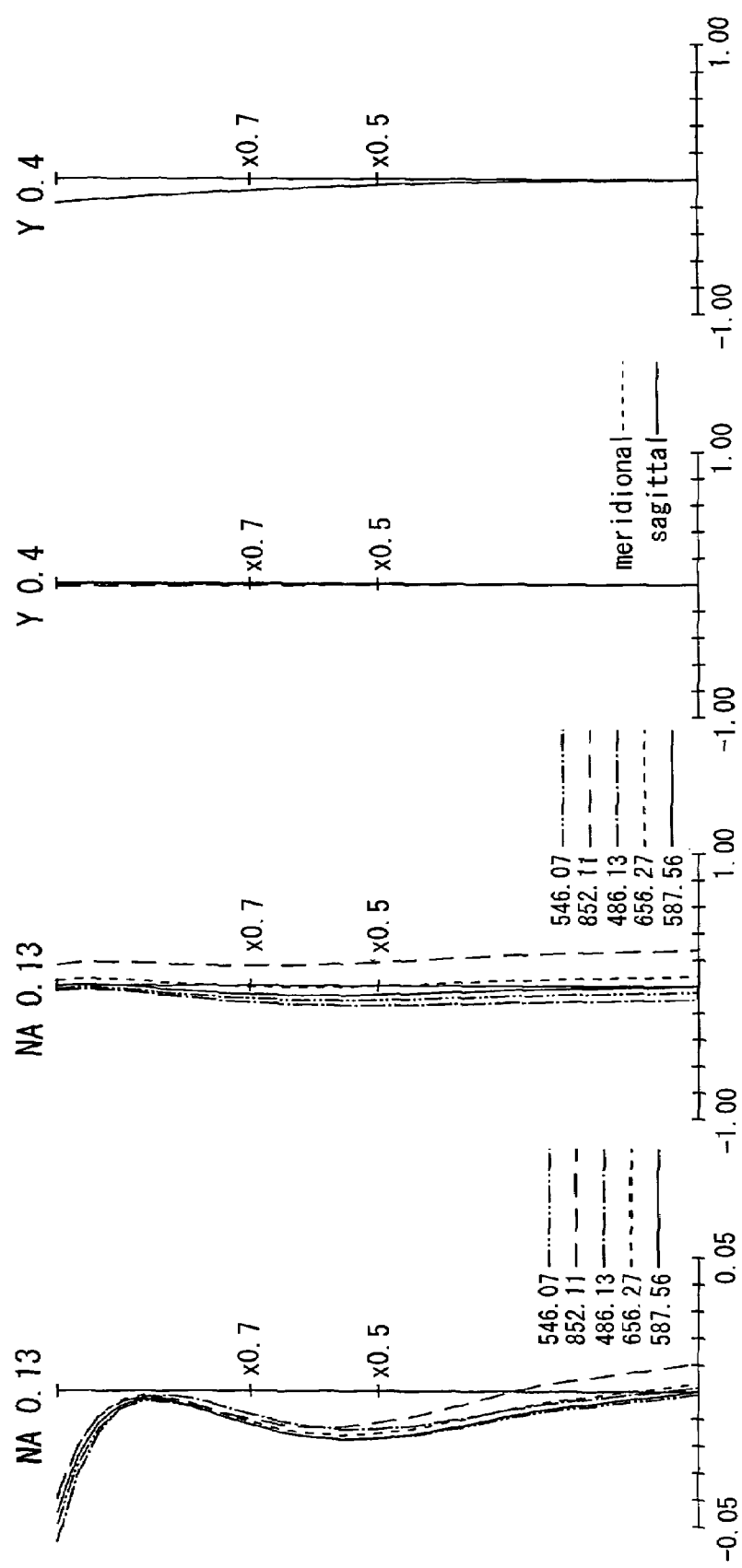
FIGS. 22A to 22D are diagrams depicting aberrations of the system shown in FIG. 21, where

Regarding the relay optical system 101 according to this working example, lens data is shown in Table 8, a cross-sectional view is shown in FIG. 21, and aberration diagrams are shown in FIGS. 22A to 22D.

The relay optical system 101 according to this working example includes a first lens component formed of a parallel plate $L_{101}$; a second lens component formed of a planoconvex lens $L_{102}$; a third lens component with negative refractive power, which is a compound lens of a planoconvex lens $L_{103}$ and a planoconcave lens $L_{104}$; a fourth lens component with negative refractive power, which is a compound lens of a positive meniscus lens $L_{105}$ and a negative meniscus lens $L_{106}$; a fifth lens component with positive refractive power, which is a compound lens of a negative meniscus lens $L_{107}$ and a positive meniscus lens $L_{108}$; and a sixth lens component with positive refractive power, which is a compound lens of a biconvex lens $L_{109}$ and a negative meniscus lens $L_{110}$. The first lens component and the second lens component constitute the first lens group $G_1$, the third lens component and the fourth lens component constitute the second lens group $G_2$, and the fourth lens component and the fifth lens component constitute the third lens group $G_3$.

TABLE 8

|  | r | d | nd | vd |
|---|---|---|---|---|
| Object side |  |  |  |  |
| 1 | ∞ | 4.67 | 1.7725 | 49.6 |
| 2 | ∞ | 1 |  |  |
| 3 | 2.385 | 2 | 1.43875 | 94.93 |
| 4 | ∞ | 0.2 |  |  |
| 5 | ∞ | 1.73 | 1.43875 | 94.93 |
| 6 | −1.462 | 0.012 | 1.56444 | 43.79 |
| 7 | −1.462 | 2.34 | 1.6779 | 55.34 |
| 8 | ∞ | 1.7 |  |  |
| 9 | −2.339 | 2.23 | 1.43875 | 94.93 |
| 10 | −2.339 | 0.012 | 1.56444 | 43.79 |
| 11 | −2.339 | 5.17 | 1.7725 | 49.6 |
| 12 | −6.021 | 3.63 |  |  |
| 13 | 24.102 | 5.16 | 1.51633 | 64.14 |
| 14 | 6.202 | 0.012 | 1.56444 | 43.79 |
| 15 | 6.202 | 3 | 1.6779 | 55.34 |
| 16 | 15.002 | 5 |  |  |
| 17 | 16.326 | 5 | 1.43875 | 94.93 |
| 18 | −7.205 | 0.012 | 1.56444 | 43.79 |
| 19 | −7.205 | 1.7 | 1.7725 | 49.6 |
| 20 | −16.508 |  |  |  |
| Image side |  |  |  |  |

In this working example, the parameters in conditional expression (7) are as shown below.

$F_1=5.44$ $F_2=-5.18$ $NA=0.13$ $F_T=35.95$ $|F_1^2 \cdot NA/(F_2 \cdot F_T)|=0.0196$ Fourth Working Example The relay optical system 101 according to a fourth working example has a small-diameter distal optical system 110 at a tip thereof adjacent to the specimen A so that the small-diameter distal optical system 110 can be brought near to or into contact with the specimen A. When various organs of a small laboratory animal, such as a rat or a mouse, are to be examined over a long period of time while the animal is alive (in vivo), the skin and muscular tissue are cut open. Since the objective optical system according to this working example has a long small-diameter section, organs existing at a deeper site can be examined.

Figure 23:
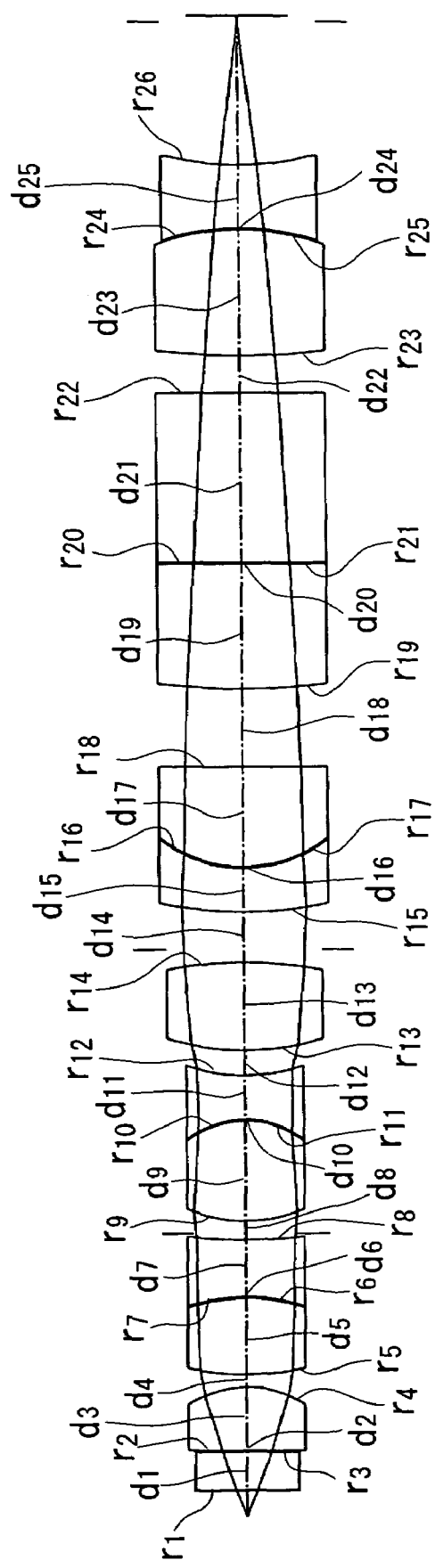
FIG. 23 is a cross-sectional view of a fourth working example depicting a small-diameter distal optical system arranged at the end, adjacent to a specimen A, of the relay optical system in FIG. 15.

Regarding the small-diameter distal optical system 110 according to this working example, lens data is shown in Table 9, a cross-sectional view is shown in FIG. 23, and aberration diagrams in a case where the small-diameter distal optical system 110 in FIG. 23 is combined at the tip (adjacent to specimen A) of the relay optical system 101 in FIG. 16 are shown in FIGS. 24A to 24D.

This working example assumes that the small-diameter distal optical system 110 having specifications shown in Table 9 is arranged at the tip (adjacent to the specimen A) of the relay optical system 101 according to the first embodiment. However, the specifications of the small-diameter distal optical system 110 are not limited to those listed in Table 9. In addition, the small-diameter distal optical system 110 can be used with any of the relay optical systems 101 according to the first to third working examples, and furthermore, with other relay optical systems having different specifications.

TABLE 9

|  | r | d | nd | vd |
|---|---|---|---|---|
| Object side |  | 0.2 | water |  |
| 1 | ∞ | 0.3 | 1.51633 | 64.14 |
| 2 | ∞ | 0.012 | 1.56444 | 43.79 |
| 3 | ∞ | 0.5 | 1.7725 | 49.6 |
| 4 | −0.804 | 0.1 | 1 |  |
| 5 | 2.049 | 0.6 | 1.741 | 52.64 |
| 6 | −1.392 | 0.012 | 1.56444 | 43.79 |
| 7 | −1.392 | 0.45 | 1.6134 | 44.27 |
| 8 | 3.677 | 0.15 | 1 |  |
| 9 | 1.108 | 0.8 | 1.43875 | 94.93 |
| 10 | −0.703 | 0.012 | 1.56444 | 43.79 |
| 11 | −0.703 | 0.35 | 1.6134 | 44.27 |
| 12 | 1.322 | 0.2 | 1 |  |
| 13 | 1.961 | 0.7 | 1.43875 | 94.93 |
| 14 | −3.002 | 0.4 | 1 |  |
| 15 | 3.002 | 0.35 | 1.7725 | 49.6 |
| 16 | 1.009 | 0.012 | 1.56444 | 43.79 |
| 17 | 1.009 | 0.8 | 1.6779 | 55.34 |
| 18 | ∞ | 0.62 | 1 |  |
| 19 | 5.02 | 1 | 1.6779 | 55.34 |
| 20 | ∞ | 0.012 | 1.56444 | 43.79 |
| 21 | ∞ | 1.35 | 1.6779 | 55.34 |
| 22 | ∞ | 0.3 | 1 |  |
| 23 | 5.168 | 1 | 1.7725 | 49.6 |
| 24 | −1.869 | 0.012 | 1.56444 | 43.79 |
| 25 | −1.869 | 0.5 | 1.51633 | 64.14 |
| 26 | 2.132 |  |  |  |
| Image side |  |  |  |  |

In this working example, the parameters in conditional expression (8) are as shown below.

$F_1=11.26$ $\phi_{ob}=0.2$ $NA_{ob}=0.5$ $F_1/(\phi_{ob} \cdot NA_{ob})=112.64$

What is claimed is:
1. A microscope system comprising:
a light source;
an objective unit including:
  an objective optical system for focusing light emitted from the light source onto a specimen, the objective optical system including a small-diameter distal optical system arranged at an end that is brought near to or into contact with the specimen;
  a threaded mount provided at a coupling position; and
  an outer cylinder enclosing the small-diameter distal optical system;
an imaging optical system for forming an image of light that is emitted from the specimen and passes through the objective optical system;
a microscope main body for housing the imaging optical system, the objective unit being detachable from and attachable to the microscope main body with the threaded mount at the coupling position;
a light-scanning unit for scanning excitation light from the light source onto a surface of the specimen;
a pupil-projection optical system disposed between the light-scanning unit and the imaging optical system to project a back focal position of the objective optical system near the light-scanning unit;

a collimating optical system for focusing light that passes through the pupil-projection optical system; and
a photodetector for detecting light focused by the collimating optical system,
wherein the light source includes a laser light source;
wherein conditional expression $0.15 \leq Lm/Lp \leq 0.5$ is satisfied, where Lm represents the distance from the coupling position of the objective optical system to a position of the intermediate image along an optical axis, and Lp represents the distance along the optical axis from the coupling position to a position that has a conjugate relationship with the back focal position of the objective optical system through the imaging optical system and the pupil-projection optical system; and
wherein conditional expression $Df/Da \leq 0.3$ is satisfied, where Df represents the outer diameter of the outer cylinder and Da represents the outer diameter of the threaded mount.

2. The microscope system according to claim 1, wherein the objective optical system further includes a relay optical system for substantially collimating light of an intermediate image formed by focusing light from an object image in the specimen with the small-diameter distal optical system.

3. The microscope system according to claim 2, further comprising:
an attachment mechanism for detachably and attachably connecting the relay optical system and the small-diameter distal optical system near the intermediate image.

4. The microscope system according to claim 3, wherein the attachment mechanism is capable of fixing the relay optical system and the small-diameter distal optical system to each other at any relative rotational angle about an axis thereof.

5. The microscope system according to claim 2, wherein the small-diameter distal optical system includes an extension optical system for forming a plurality of intermediate images at intervals in an optical axis direction.

6. The microscope system according to claim 5, wherein the extension optical system is detachable and attachable.

7. The microscope system according to claim 1, further comprising:
an orientation-adjusting mechanism capable of adjusting the microscope main body at any orientation and position with respect to the specimen.

8. The microscope system according to claim 1, wherein the light source and the photodetector are optically connected to the collimating optical system with an optical fiber.

9. The microscope system according to claim 1, wherein conditional expression $0.15 \leq Lm/Ltl \leq 0.5$ is satisfied, where Lm represents the distance from the coupling position of the objective optical system to a position of the intermediate image along an optical axis, and Ltl represents the distance along the optical axis from a position of an image formed by the imaging optical system to the intermediate image.

10. The microscope system according to claim 1, wherein the threaded mount of the objective unit has an outer diameter Da of 20.32 mm and a pitch of 0.706 mm.

11. The microscope system according to claim 10, wherein the small-diameter distal optical system has a length of at least 5 mm.

12. The microscope system according to claim 11, wherein the small-diameter distal optical system includes a portion with a length of at least 2 mm, the diameter of the outer cylinder being 1.5 mm or less over the portion.

* * * * *